US007983490B1

(12) United States Patent
Minter

(10) Patent No.: US 7,983,490 B1
(45) Date of Patent: *Jul. 19, 2011

(54) ADAPTIVE BAYES PATTERN RECOGNITION

(76) Inventor: Thomas Cecil Minter, Coldspring, TX (US)

( * ) Notice: Subject to any disclaimer, the term of this patent is extended or adjusted under 35 U.S.C. 154(b) by 879 days.

This patent is subject to a terminal disclaimer.

(21) Appl. No.: 12/004,329

(22) Filed: Dec. 20, 2007

(51) Int. Cl.
*G06K 9/62* (2006.01)
(52) U.S. Cl. ............ 382/224; 706/12; 382/159
(58) Field of Classification Search .......... 382/224
See application file for complete search history.

(56) References Cited

U.S. PATENT DOCUMENTS

| | | | |
|---|---|---|---|
| 5,373,486 A | 12/1994 | Dowla | |
| 6,216,134 B1 | 4/2001 | Heckerman | |
| 6,317,517 B1 | 11/2001 | Lu | |
| 6,519,575 B1 | 2/2003 | Goebel | |
| 6,690,829 B1 | 2/2004 | Kressel | |
| 6,728,689 B1 | 4/2004 | Drissi | |
| 6,829,561 B2 | 12/2004 | Keller | |
| 6,832,069 B2 * | 12/2004 | Stout et al. | 434/353 |
| 6,857,112 B1 * | 2/2005 | Teig et al. | 716/115 |
| 6,883,148 B1 * | 4/2005 | Teig et al. | 716/115 |
| 6,910,025 B2 * | 6/2005 | Cao | 706/15 |
| 6,944,338 B2 | 9/2005 | Lock | |
| 6,993,156 B1 | 1/2006 | Szeliski | |
| 6,993,452 B2 | 1/2006 | Huang | |
| 7,085,426 B2 * | 8/2006 | August | 382/260 |
| 7,164,791 B2 | 1/2007 | Cecala | |
| 7,272,583 B2 | 9/2007 | Bradski | |
| 7,593,851 B2 * | 9/2009 | Yang | 704/228 |
| 7,706,610 B2 * | 4/2010 | Zhang et al. | 382/173 |
| 2003/0118246 A1 * | 6/2003 | August | 382/260 |
| 2005/0123893 A1 * | 6/2005 | Stout et al. | 434/353 |
| 2008/0015793 A1 * | 1/2008 | Ben-Menahem et al. | 702/30 |
| 2009/0057395 A1 * | 3/2009 | He et al. | 235/379 |

OTHER PUBLICATIONS

Belcher, W. M. and Minter, T. C., "Selecting Class Weights to Minimize Classification Bias in Acreage Estimation" (1976). LARS Symposia. Paper 133. http://docs.lib.purdue.edu/lars_symp/133.*
Havens, K. A.; Minter, T. C.; and Thadani, S. G., "Estimation of the Probability of Error without Ground Truth and Known A Priori Probabilities" (1976). LARS Symposia. Paper 134. http://docs.lib.purdue.edu/lars_symp/134.*
Lin, G. C. and Minter, T. C., "Bayes Estimation on Parameters of the Single-Class Classifier" (1976). LARS Symposia. Paper 135. http://docs.lib.purdue.edu/lars_symp/135.*
Minter, T. C., "Single-Class Classification" (1975). LARS Symposia. Paper 54. http://docs.lib.purdue.edu/lars_symp/54.*
T. C. Minter, "A Discriminant Procedure for Target Recognition in Imagery Data", Proc. of the IEEE 1980 National Aerospace and Electronic Conference—NAECON 1980, May 1980.

(Continued)

*Primary Examiner* — Sath V Perungavoor

(57) ABSTRACT

A system and method for classifying input patterns into two classes, a class-of-interest and a class-other, utilizing a method for estimating an optimal Bayes decision boundary for discriminating between the class-of-interest and class-other, when training samples or otherwise, are provided a priori only for the class-of-interest thus eliminates the requirement for any a priori knowledge of the other classes in the data set to be classified, while exploiting the robust and powerful discriminating capability provided by fully supervised Bayes classification approaches. The system and method may be used in applications where class definitions, through training samples or otherwise, are provided a priori only for the classes-of-interest. The distribution of the other-class may be unknown or may have changed. Often one is only interested in one class or a small number of classes.

17 Claims, 28 Drawing Sheets

OTHER PUBLICATIONS

B. Gorte et al., "Non-parametric classification algorithm with an unknown class", Proceedings of the International Symposium on Computer Vision, pp. 443-444 1995.

A. Guerrero, et al., "Supervised Classification of Remote Sensing Images with Unknown Classes," Proceedings of IGARSS—2002 Conference, Toronto, Canada, Jun. 2002.

P. Mantero, "Partially supervised classification of remote sensing images using SVM-based probability density estimation", IEEE Trans. on Geo. and Remote Sen., Mar. 2005 p. 559.

T. Cacoullos, "Estimation of a multivariate density," Ann. Inst. Statist. Math., vol. 18, pp. 179-189, 1966.

R. O. Duda and P. E. Hart, Pattern Classification and Scene Analysis, New York: John Wiley & Sons, 1973.

B. Eckstein, "Evaluating the Benefits of assisted Target Recognition", Proceeding of the 30th Applied Imagery Pattern recognition Workshop (AIPR 01), 2001.

K. Fukunaga, et al., "Bayes Error Estimation Using Parzen and k-NN Procedures", IEEE Trans. on Pat. Anal. and Mach. Intel., vol. PAMI-9, No. 9, No. 5, Sep. 1987.

J. Grim, J. Novovicova, P. Pudil, and P. Somol, "Initialing Normal Mixtures of Densities," Proc. of the 14th International Conference on Pattern Recognition-vol. 1, 1998.

A. K. Jain, R. W. Duin, and J. Mao, "Statistical Pattern Recognition: A Review", IEEE Trans. on Pat. Analysis and Machine Intel., vol. 22, No. 1, pp. 4-37, Jan. 2000.

B. Jeon and D. A. Landgrebe, "Partially Supervised Classification With Optimal Significance Testing," Geoscience and Remote Sensing Symposium, 1993, pp. 1370-1372.

E. Fix and J. L. Hodges, "Discriminatory analysis, nonparametric discrimination," USAF School of Aviation Medicine, Randolph Field, Tex Project 21-49-004, Rep. 4, 1951.

M. Rosenblatt, "Remarks on some nonparametric estimates of a density function," Ann. Math. Statist., vol. 27, pp. 832-837, 1956.

P. Whittle, "On the smoothing of probability density functions," J. Roy. Statist., Ser B, vol. 20, pp. 334-343, 1958.

M. C. Jones and D. A. Henderson, "Maximum likelihood kernel density estimation," Technical Report May 2001, Department of Statistics, Open University, 2001.

J. Grim, J. Novovicova, P. Pudil, and P. Somol, "Initialing Normal Mixtures of Densities," Proc. of the 14th Intnl Conference on Pattern Recognition—vol. 1, p. 886, 1998.

Minter, T. C. et al., Probabilistic cluster labeling of imagery data, NASA Report Accession No. 83A11410; Doc. ID: 198300192, 1981.

Chittineni, C. B., Some approaches to optimal cluster labeling of aerospace imagery, NASA Report, Accession No. 81A30315; Doc. ID 19810045911, 1980.

A. K. Jain, "Biometrics: A Grand Challenge", Proceeding of the 17th International Conference on Pattern Recognition, (ICPR'04) 2004.

NIST Report, "Summary of NIST Standards for Biometric Accuracy, Tamper Resistance, and Interoperability." ftp://sequoyah.nist.gov/pub/nist_internal_reports/NISTAPP_Nov02.pdf, 2002.

S. Rizvi, "Fusion Techniques for Automatic Target Recognition", Proceedings of the 32nd Applied Imagery Pattern Recognition Workshop (AIPR'03), 2003.

* cited by examiner

GENERATING STATISTICS $$\mu_{C_1} = \begin{bmatrix} 0 \\ 0 \end{bmatrix}, \quad \Sigma_{C_1} = \begin{bmatrix} 1 & 0.5 \\ 0.5 & 1 \end{bmatrix}$$

$$\mu_{C_2} = \begin{bmatrix} 2 \\ 2 \end{bmatrix}, \quad \Sigma_{C_2} = \begin{bmatrix} 1 & -0.5 \\ -0.5 & 1 \end{bmatrix}$$

$$P_{C_{i1}} = 0.5, \quad P_{C_2} = 0.5$$

FIG. 6C

Generating Statistics

$$\mu_{C_{int}} = \begin{bmatrix} 0 \\ 0 \end{bmatrix}, \quad \Sigma_{C_{int}} = \begin{bmatrix} 1 & 0.5 \\ 0.5 & 1 \end{bmatrix}$$

$$\mu_{C_{other}} = \begin{bmatrix} 2 \\ 2 \end{bmatrix}, \quad \Sigma_{C_{other}} = \begin{bmatrix} 1 & -0.5 \\ -0.5 & 1 \end{bmatrix}$$

$$P_{C_{int}} = 0.5, \quad P_{C_{other}} = 0.5$$

FIG.10D

Generating Statistics $$\mu_{C_{int}} = \begin{bmatrix} 0 \\ 0 \end{bmatrix}, \quad \Sigma_{C_{int}} = \begin{bmatrix} 4 & 0 \\ 0 & 0.5 \end{bmatrix}$$

$$\mu_{C_{other}} = \begin{bmatrix} 0 \\ 0 \end{bmatrix}, \quad \Sigma_{C_{other}} = \begin{bmatrix} 0.5 & 0 \\ 0 & 4 \end{bmatrix}$$

$$P_{C_{int}} = 0.5, \quad P_{C_{other}} = 0.5$$

FIG. 11D

Generating Statistics $$\mu_{C_{int}} = \begin{bmatrix} 0 \\ 0 \end{bmatrix}, \quad \Sigma_{C_{int}} = \begin{bmatrix} 1 & 0 \\ 0 & 1 \end{bmatrix}$$

$$\mu_{C_{other}} = \begin{bmatrix} 0 \\ 0 \end{bmatrix}, \quad \Sigma_{C_{other}} = \begin{bmatrix} 4 & 0 \\ 0 & 4 \end{bmatrix}$$

$$P_{C_{int}} = 0.5, \quad P_{C_{other}} = 0.5$$

FIG.12D

|  | Gaussian Maximum Likelihood Classifier | Adaptive Bayes Classifier using Cluster Labels |
|---|---|---|
| Classification Accuracy | 91.4% | 91.4% |

FIG.15C $$\text{Generating Statistics}$$

$$\mu_{C_1} = \begin{bmatrix} 2 \\ 2 \end{bmatrix}, \quad \Sigma_{C_1} = \begin{bmatrix} 1 & 0.5 \\ 0.5 & 1 \end{bmatrix}$$

$$\mu_{C_2} = \begin{bmatrix} 2 \\ 2 \end{bmatrix}, \quad \Sigma_{C_2} = \begin{bmatrix} 0.5 & 0 \\ 0 & 0.5 \end{bmatrix}$$

$$\mu_{C_3} = \begin{bmatrix} 4 \\ -4 \end{bmatrix}, \quad \Sigma_{C_3} = \begin{bmatrix} 0.5 & 0 \\ 0 & 0.5 \end{bmatrix}$$

$$\mu_{C_4} = \begin{bmatrix} -2 \\ 2 \end{bmatrix}, \quad \Sigma_{C_4} = \begin{bmatrix} 1 & -0.5 \\ -0.5 & 1 \end{bmatrix}$$

$$\mu_{C_5} = \begin{bmatrix} 0 \\ -2 \end{bmatrix}, \quad \Sigma_{C_5} = \begin{bmatrix} 1 & -0.5 \\ -0.5 & 1 \end{bmatrix}$$

$$P_{C_1} = 0.3, \quad P_{C_2} = 0.2, \quad P_{C_3} = 0.1, \quad P_{C_4} = 0.2, \quad P_{C_5} = 0.2$$

ADAPTIVE BAYES PATTERN RECOGNITION

FEDERALLY SPONSORED RESEARCH

Not Applicable

SEQUENCE LISTING OR PROGRAM

Not Applicable

BACKGROUND OF THE INVENTION

1. Field of Invention

This invention relates generally to systems and methods for assigning input patterns into two classes and relates specifically to a method for estimating an optimal Bayes decision boundary for discriminating between a class-of-interest and a class-other when training samples or otherwise, are provided a priori only for the class-of-interest and without any a priori knowledge of any other classes that may exist in the data set to be classified.

2. Prior Art—FIGS. 1, 2, 3, and 4

Pattern recognition is used in a variety of engineering and scientific areas. Interest in the area of pattern recognition has been renewed recently due to emerging new applications which are very challenging [A. K. Jain, R. W. Duin, and J. Mao, "Statistical Pattern Recognition: A Review", *IEEE Transactions on Pattern Analysis and Machine Intelligence*, vol. 22, no. 1, pp. 4-37, January 2000, pp. 4]. These applications include classification of remotely sensed images (thematic mapping, crop inventorying), document classification (searching for text documents), financial forecasting, organization and retrieval of multimedia data bases, and recognition of objects of interest in images—such as real-time identification of high valued military targets in imagery, and screening of x-rays and MRI's for medical conditions.

Most of the literature on pattern recognition is restricted to fully supervised pattern recognition applications where training samples are available which completely characterize all of the classes (objects) to be recognized in the data set to be classified. Using these training samples, optimal discriminant functions can be derived which provide minimum error in recognizing these known classes (objects) a data set.

However, in the real world, there are many applications where prior knowledge, through training samples or otherwise, is only available for a single class; the classes-of-interest. The distribution of the other-class may be unknown, may have changed, may be inaccurate due to insufficient numbers of samples used to estimate the distribution of the other-class. In addition, the cost of obtaining labeling samples, for purposes of defining all the classes in a given dataset, by collecting ground truth or otherwise, may be very expensive or impossible to obtain. Often one is only interested in one class or a small number of classes.

The simplest technique for handling the problem of unknown classes consists of thresholding based on a measure of similarity of a measurement to the class-of-interest [B. Jeon and D. A. Landgrebe, "Partially Supervised Classification With Optimal Significance Testing," Geoscience and Remote Sensing Symposium, 1993, pp. 1370-1372]. If the similarity measure (the statistical probability) is lower than some threshold, the sample is assumed to belong to an unknown class; otherwise, it is assigned to the class-of-interest. Even if an optimal threshold is selected, this procedure does not ensure minimum probability of error in classification.

The Adaptive Bayes Decision Rule

Another approach for handling unknown classes is to use a modified form of the Bayes decision rule. Bayes decision theory is a fundamental approach to the problem of pattern recognition [R. O. Duda and P. E. Hart, *Pattern Classification and Scene Analysis*, New York: John Wiley & Sons, 1973, pp. 11-17]. The approach is based on the assumption that the decision problem can be poised in probabilistic terms where all of the relevant probability values are known. Specifically, the application of a standard Bayesian classifier usually requires estimation of the posterior probabilities of each class. If information about the probability distributions of classes is available, the posterior probability can be calculated for each measurement and each measurement is attributed to the class with the highest posterior probability.

However, this traditional approach is not feasible when the presence of an unknown other-class has to be considered. Traditional approaches require that the statistics of the other-class be known in advance or a training set be available for estimating the statistics of the other-class". Minter [T. C. Minter, "A Discriminant Procedure for Target Recognition in Imagery Data", Proceedings of the IEEE 1980 National Aerospace and Electronic Conference—NAECON 1980, May 20-22, 1980] proposed an alternative formulation of the standard Bayes decision rule to addresses this problem.

The decision making process for Bayes pattern recognition can be summarized as follows: Given a set of measurement vectors, $X=\{X_1, X_2, \ldots X_N\}$, it desired is to associate the measurements with either the classes-of-interest or the other-class with minimum probability error. The measurement, X, can conveniently be represented as a d-dimensional vector in the measurement space. This vector will be called the measurement vector or simply a sample or a pattern and will be denoted as $X=(x_1, x_2, \ldots x_d)^T$ where d is the number of measurements or the dimensionality of the measurement space.

For the moment, let us assume that complete information is available on the class-of-interest and the other-class. Using training samples from these two classes, we can estimate conditional probability density functions for the two classes, $P(X/C_{int})$ for the class-of-interest, and $P(X/C_{other})$ for the other-class. We will assume the prior probabilities for the two classes, $P_{C_{int}}$ and $P_{C_{other}}$, are known. Using these conditional probability estimates, the standard maximum likelihood decision rule for this two class pattern recognition problem is:

If: $P_{C_{int}} P(X/C_{int}) \geq P_{C_{other}} P(X/C_{other})$, (1)

Classify X as the class-of-interest where $P(X/C_{int})$=Conditional probability density function of the class-of-interest $P(X/C_{other})$=Conditional probability density function of class-other $P_{C_{int}}$=prior probability of the class-of-interest $P_{C_{other}}$=prior probability of class-other Illustrated in FIG. 1, is a maximum likelihood classifier where we have assumed normal distributions for the class-conditional probability density functions $P(X/C_{int})$ 12 and $P(X/C_{other})$ 14 and the uni-variate Gaussian density function is defined as $$P(X/C_i) = \frac{1}{2\pi^{1/2} \sigma_i} e^{-1/2 \left( \frac{x-\mu_i}{\sigma_i} \right)^2} \qquad (2)$$

Referencing FIG. 1, it can be seen that the decision boundary 10 is located at the point where the two conditional probability density functions are equal.

The density function parameters in FIG. 1 are $\mu_{C_{int}}=7$, $\mu_{C_{other}}=13$, $\sigma^2_{C_{int}}=3$, and $\sigma^2_{C_{other}}=3$. The prior probabilities are $P_{C_{int}}=0.5$ and $P_{C_{other}}=0.5$.

An equivalent decision rule, to that shown in eq. (1), is obtained by dividing both sides of eq. (1) by the unconditional probability of X, which is P(X). We get $$\text{If:} \frac{P_{C_{int}} p(X/C_{int})}{P(X)} \geq \frac{P_{C_{other}} P(X/C_{other})}{P(X)}; \quad (3)$$

Classify X as the class-of-interest
where $$P(X) = P_{C_{int}} P(X/C_{int}) + P_{C_{other}} P(X/C_{other}) \quad (4)$$

Referencing FIG. 2, a graph is shown of P(X) 16, as defined in eq. (4).
(3) is the Bayes decision rule. It can also be defined in terms of posterior probabilities as:

$$\text{If: } P(C_{int}/X) \geq P(C_{other}/X), \quad (5)$$

Classify X as the class-of-interest
where $P(C_{int}/X)$ and $P(C_{other}/X)$ are the posterior probability functions for the class-of-interest and the other-class respectively which are defined as:

$$P(C_{int}/X) = \frac{P_{C_{int}} P(X/C_{int})}{P(X)} \quad (6)$$

$$P(C_{other}/X) = \frac{P_{C_{other}} P(X/C_{other})}{P(X)} \quad (7)$$

Referencing FIG. 3, a graph is shown of the class-of-interest 20 and class-other posterior distribution functions 22, as defined in eq. (6) and (7). Again, referencing FIG. 3, it can be seen that the two class-conditional posterior distribution functions have maximum values of one and the two functions are equal to one-half 24 at the decision boundary 18.

Noting that the two posterior probability functions sum to one, or $$P(C_{int}/X) + P(C_{other}/X) = 1 \quad (8)$$

We can re-arrange eq. (8) to get $$P(C_{other}/X) = 1 - P(C_{int}/X) \quad (9)$$

Substituting eq. (9) into (5) and simplifying, we obtain a decision rule which is equivalent to the standard Bayes decision function, but only involves the posterior distribution function for the class-of-interest, namely $$\text{If: } P(C_{int}/X) \geq \tfrac{1}{2}, \quad (10)$$

Classify X as the class-of-interest
Otherwise classify X as class-other
where $$P(C_{int}/X) = \frac{P_{C_{int}}(P(X/C_{int}))}{P(X)} \quad (11)$$

Eq. (10) is referred to as the adaptive Bayesian decision rule. Referencing FIG. 4, a graph is shown of the class-of-interest posterior distribution function, $P(C_{int}/X)$ 28, as defined in eq. (11). The decision boundary 26 is located at the point where the class-of-interest posterior distribution function is equal to one-half, 30. The a priori probability $P_{C_{int}}$ is assumed to be known.

The adaptive Bayesian decision rule, eq. (10), is adaptive in the sense that it adapts the decision boundary to provide optimal discrimination between class-of-interest and any unknown class-other which may exist in the data set to be classified. Implementing the adaptive Bayes rule requires that we obtain estimates for the two density functions in eq. (11). The class-conditional probability density function, $P(X/C_{int})$, in eq. (11), can be estimated using labeled sample from the class-of-interest. The unconditional probability density function, P(X) in eq. (11), is not conditioned of a class and can be estimated using unlabeled samples from the data set to be classified. The a priori probability, $P_{C_{int}}$, is assumed to be known. A number of nonparametric density function estimation techniques are available for estimating P(X). Using estimates for $P(X/C_{int})$ and P(X), the posterior distribution of the class-of-interest, eq. (10) can be defined and we can then classify the input-data-set using the adaptive Bayes rule using eq. (10).

In addition, it is shown below that the class-of-interest posterior distribution, $P(C_{int}/X)$, can be approximated using a least squares estimator.

Approximating the Class-of-Interest Posterior Distribution Function Using Nonparametric Density Estimation Techniques Density functions $P(X/C_{int})$ and P(X), eq. (11), can be estimated using any of several non-parametric density techniques such as histogramming, Parzen kernel density estimation, and $K^{th}$ nearest neighbor estimation. Gorte [B. Gorte and N. Gorte-Kroupnova, "Non-parametric classification algorithm with an unknown class", *Proceedings of the International Symposium on Computer Vision*, 1995, pp. 443-448], Mantero [P. Mantero, "Partially supervised classification of remote sensing images using SVM-based probability density estimation", IEEE Transactions on Geoscience and Remote Sensing, vol. 43, no. 3, March 2005, pp. 559-570], and Guerrero-Curieses [A. Guerrero-Curieses, A Biasiotto, S. B. Serpico, and G. Moser, "Supervised Classification of Remote Sensing Images with Unknown Classes," Proceedings of IGARSS-2002 Conference, Toronto, Canada, June 2002] investigated the use of the $K^{th}$ nearest neighbor probability estimation [R. O. Duda and P. E. Hart, *Pattern Classification and Scene Analysis*, New York: John Wiley & Sons, 1973, pp. 95-98] in approximating the class-of-interest posterior distribution function, $P(C_{int}/X)$, and its use in classifying remotely sensed data using the adaptive Bayes decision rule, eq. (10),. $K^{th}$ nearest neighbor has two disadvantages. The first disadvantage is that a $K^{th}$ nearest neighbor estimate of the class-of-interest posterior probability function $P(C_{int}/X)$ is very dependent on the value selected for K. Fukunaga [K. Fukunaga, D. M. Hummels, "Bayes Error Estimation Using Parzen and k-NN Procedures", IEEE Transactions on Pattern Analysis and Machine Intelligence, Vol. PAMI-9, Number 5, September 1987, p. 634-643] concluded there is no optimal method for selecting a value for K. The approach often used is to evaluate the classification accuracy obtained using various values of K and select the value of K that maximizes classification accuracy. However, this approach requires that labeled samples be available from all the classes for use in evaluating classification accuracy. The second disadvantage is that $K^{th}$ nearest neighbor is computationally slow as a result of the need to repeatedly compute the distance, from the measurement vector to be classified, to the other measurements vectors in the data set.

Least Squares Estimation of the Class-of-Interest Posterior Distribution Function Minter [T. C. Minter, "A Discriminant Procedure for Target Recognition in Imagery Data", Proceedings of the IEEE 1980 National Aerospace and Electronic Conference—NAECON 1980, May 20-22, 1980], proposed a least squares criterion for estimating the class-of-interest posterior distribution, $P(C_{int}/X)$, in eq. (10). The class-of-interest posterior distribution can be approximated by minimizing the mean square difference between the estimated posterior distribution function and the true posterior distribution function for the class-of-interest. This is accomplished using the following least squares criterion:

$$J=\int(\hat{P}(C_{int}/X)-P(C_{int}/X))^2 P(X)dX+K \quad (12)$$

where $$P(C_{int}/X) = \frac{P_{C_{int}} P(X/C_{int})}{P(X)} \quad (13)$$

In eq. (12), $\hat{P}(C_{int}/X)$ is the estimated class-of-interest posterior distribution function, $P(C_{int}/X)$ is the true (but unknown) class-of-interest posterior distribution, and K is an arbitrary constant. However, the least squares criteria, shown in eq. (12), cannot be minimized directly since the true class-of-interest posterior distribution function, $P(C_{int}/X)$, is unknown.

The least square criterion is reformulated below to provide an equivalent criterion that can be minimized and used to estimate the class-of-interest posterior distribution function $\hat{P}(C_{int}/X)$.

First, expanding the least squares criteria, eq. (12), we get $$J=\int(\hat{P}(C_{int}/X)^2-2\hat{P}(C_{int}/X)P(C_{int}/X)+P(C_{int}/X)^2)P(X) dX+K \quad (14)$$

$$J=\int(\hat{P}(C_{int}/X)^2 P(X)dX-\int 2\hat{P}(C_{int}/X)P(C_{int}/X)P(X)dX+\int P(C_{int}/X)^2 P(X)dX+K \quad (15)$$

$$J = \int \left( \hat{P}(C_{int}/X)^2 P(X)dX - \int 2\hat{P}(C_{int}/X)\frac{P_{C_{int}}P(X/C_{int})}{P(X)}P(X)dX + \int P(C_{int}/X)^2 P(X)dX + K \right) \quad (16)$$

$$J = \int \left( \hat{P}(C_{int}/X)^2 P(X)dX - \int 2\hat{P}(C_{int}/X)P_{C_{int}}P(X/C_{int}) \right. \\ \left. P(X)dX + \int P(C_{int}/X)^2 P(X)dX + K \right)$$

Now let $$K'=2P_{C_{int}}=2P_{C_{int}}\int P(X/C_{int})dX \quad (17)$$

and we get:

$$J=\int(\hat{P}(C_{int}/X)^2 P(X)dX-2P_{C_{int}}\int[\hat{P}(C_{int}/X)-1]P(X/C_{int}) dX+K' \quad (18)$$

Next we define the expected value with respect to the labeled samples from the class-of-interest as:

$$E_{C_{int}}(\circ)=\int(\circ)P(X/C_{int})dX \quad (19)$$

The expected value with respect to the unlabeled samples from P(X) (the data to be classified) is defined as:

$$E(\circ)=\int(\circ)P(X)dX \quad (20)$$

Using these definitions, the least square criteria, eq. (18), can be rewritten as:

$$J=E[\hat{P}(C_{int}/X)^2]+2P_{C_{int}}E_{C_{int}}[\hat{P}(C_{int}/X)-1]+K' \quad (21)$$

We will approximate the class-of-interest posterior distribution, $\hat{P}(C_{int}/X)$, using the following linear combination of functions-of-the-measurements.

Let $$\hat{P}(C_{int}/X) \cong A^T F(X) \quad (22)$$

where F(X) is as vector containing functions-of-the-measurements, or $$F(X)=(f(X)_1, f(X)_2, \ldots f(X)_n)^T \quad (23)$$

and A is a vector of weights for the f(X)'s $$A=(a_q, a_2, \ldots a_n)^T \quad (24)$$

Substituting eq. (22) for $\hat{P}(C_{int}/X)$ in eq. (21) we get:

$$J=E[(A^T F(X))^2]+2P_{C_{int}}E_{C_{int}}[A^T F(X)-1]+K' \quad (25)$$

This formulation of the least square error criteria, eq. (25), is equivalent to the original least squares criterion, eq. (12), however, eq. (25) can be evaluated since there are no unknowns. In addition, eq. (25) can be evaluated using only labeled samples from the class-of-interest and unlabeled samples from P(X), which is the data set to be classified.

An estimate of the parameters of the weighting vector A, eq. (24), is obtained by minimization of the least-square criterion, defined in eq. (25), with-respect-to the vector A.

Differentiating J in eq. (25) with-respect-to A and setting to zero we get:

$$\frac{\delta J}{\delta A} = 2E[(F(X)F(X)^T A)] + 2P_{C_{int}}E_{C_{int}}[F(X)] = 0 \quad (26)$$

Rearranging yields $$E[(F(X)F(X)^T)]A=-P_{C_{int}}E_{C_{int}}[F(X)] \quad (27)$$

and finally we get $$A=-P_{C_{int}}E[(F(X)F(X)^T)]^{-1} \cdot E_{C_{int}}[F(X)] \quad (28)$$

Given a set of N unlabeled samples $(X_1, X_2, \ldots X_N)$ from the data set to be classified and M labeled samples from the class-of-interest, $(X_1(C_{int}), X_2(C_{int}), \ldots X_M(C_{int}))$, the weighting vector A may be estimated as follows:

$$A = P_{C_{int}}\left[\frac{1}{N}\sum_{i=1}^{N}(F(X_i)F(X_i)^T)\right]^{-1} \cdot \frac{1}{M}\sum_{j=1}^{M}[F(X_j(C_{int}))] \quad (29)$$

Using the parameter vector A, estimated in eq. (29), the adaptive Bayes decision rule, eq. (10), can now be written as If: $A^T F(X) \geq \frac{1}{2}$, (30)

Classify X as the class-of-interest

Otherwise, classify X as class-other where eq. (22) has been substituted for $P(C_{int}/X)$, in eq. (10).

Least Squares Approximation of the Posterior Distribution of the Class-of-Interest Using a Polynomial The choice of functions used to approximate the posterior distribution function $P(C_{int}/X)$ is important. Minter [T. C. Minter, "A Discriminant Procedure for Target Recognition in Imagery Data", Proceedings of the IEEE 1980 National Aerospace and Electronic Conference—NAECON 1980, May 20-22, 1980] proposed using a multi-dimensional polynomial to approximate the class-of-interest posterior probability distribution function, $\hat{P}(C_{int}/X)$. The class-of-interest posterior distribution function, $\hat{P}(C_{int}/X)$, can be approximated with a polynomial of any order—first, second, third, etc. However, the order of the polynomial used to fit the class-of-interest posterior distribution also determines the order of the decision boundary used to separate the two classes, the class-of-interest and the class-other.

For example, if we have a two dimension measurement vector, we can approximate the class-of-interest posterior probability distribution function using a second order polynomial function, of the form:

$$\hat{P}(C_{int}/X) \cong a_0 + a_1 x_1 + a_2 x_2 + a_3 x_1 x_2 + a_4 x_1^2 + a_5 x_2^2 \quad (31)$$

or using vector notation $$\hat{P}(C_{int}/X) \cong A^T F(X) \quad (32)$$

where $$A = (a_0, a_1, a_2, a_3, a_4, a_5)^T \quad (33)$$

and $$F(X) = (1, x_1, x_2, x_1 x_2, x_1^2, x_2^2) \quad (34)$$

Use of the second order function in eq. (31) implies the decision boundary will be quadratic. If the distributions of the two class density functions are Gaussian with unequal covariances, a quadratic decision boundary is optimal [R. O. Duda and P. E. Hart, *Pattern Classification and Scene Analysis*, New York: John Wiley & Sons, 1973, pp. 30].

If the expected decision boundary is highly complex, an even higher order polynomial may be required.

The use of polynomials in approximating the class-of-interest posterior probability distribution function, $\hat{P}(C_{int}/X)$, has two disadvantages. First, a priori knowledge of the complexity of the decision boundary is required to select the appropriate order polynomial. Second, the size of the F(X) vector, eq. (34), is a function of the number of measurements and the order of the polynomial used. For a second order polynomial, the number of elements in F(X), eq. (34), is $(1-2d+d(d-1)/2)$ where d is the number of dimensions or number of measurements. When the size of F(X) becomes too large, the inversion of the $F(X)F(X)^T$ matrix, eq. (29), becomes problematic and limits the usefulness of polynomial approximations of $\hat{P}(C_{int}/X)$. For example, for a 25 dimension measurement vector (d=25) and a second order polynomial, the vector F(X) has 351 elements and the $F(X)F(X)^T$ matrix, eq. (29), is a 351×351 matrix. Cross-product terms account for most of the 351 elements in vector F(X). Inverting such a large matrix is computationally expensive and prone to numerical errors. In addition, classification of one of these twenty-five dimension measurement vectors would require the multiplication of a 351×351 matrix and a 351×1 vector, which is also computationally expensive.

SUMMARY

A system and method for classifying input patterns into two classes, a class-of-interest and a class-other, utilizing a method for estimating an optimal Bayes decision boundary for discriminating between the class-of-interest and class-other, when training samples or otherwise, are provided a priori only for the class-of-interest thus eliminates the requirement for any a priori knowledge of the other classes in the data set to be classified, while exploiting the robust and powerful discriminating capability provided by fully supervised Bayes classification approaches.

The system and method utilizes a statistical estimator capable of extracting statistical information corresponding to the other-class without recourse to the a priori knowledge normally provided by training samples from the other-class. In particular, a set of labeled patterns, descriptive of the classes-of-interest, and unlabeled patterns from the data set to be classified, are utilized to estimate an optimal Bayesian decision rule. This decision function, when applied to the input-data-set, classifies measurements with minimum error.

The system and method may be used in applications where class definitions, through training samples or otherwise, are provided a priori only for the classes-of-interest. The distribution of the other-class may be 1) unknown, 2) may have changed, 3) may be inaccurate due to insufficient numbers of samples used to estimate the distribution of the other-class or 4) the cost of obtaining labeling samples, for purposes of defining all the classes in a given data set, by collecting ground truth or otherwise, may be very expensive or impossible to obtain. Often one is only interested in one class or a small number of classes.

The operation of the system can be divided into an off-line (training) procedure and an on-line (actual classification) procedure.

In a first embodiment of the system and method, the off-line procedure, utilizes a system module to process labeled information from a set of labeled patterns, descriptive of the class-of-interest, and unlabeled patterns from the data set to be classified, to provide a least squares approximation the class-of-interest posterior distribution function, $P(C_{int}/X)$, using a weighted linear combination of Parzen kernels.

In a second embodiment of the system and method, the off-line procedure utilizes clusters representative of the input-data-set, to approximate the class-of-interest posterior distribution function, $P(C_{int}/X)$. This is accomplished by using labeled information from a set of labeled patterns, descriptive of the class-of-interest, and unlabeled patterns from the input-data-set to provide a least squares estimate of cluster labels. The class-of-interest posterior distribution function, $P(C_{int}/X)$, is then approximated using these cluster labels and their associated cluster probability density functions.

During the on-line procedure, an approximation the class-of-interest posterior distribution function, $P(C_{int}/X)$, is utilized to classify input-data-set using the adaptive Bayes decision rule, eq. (10), with minimum error.

DRAWINGS—FIGS.

FIG. 6A to 6C show is a 3D plot of the Parzen estimate of the probability density function for the sum of two bi-variant Gaussian distributions, estimated using the maximum likelihood estimate of the smoothing parameter H.

FIGS. 10A to 10D show test results from application of the first embodiment of the Adaptive Bayes Pattern Recognition system on simulated data in Test Case 1

FIGS. 11A to 11D show test results from application of the first embodiment of the Adaptive Bayes Pattern Recognition system on simulated data in Test Case 2.

FIGS. 12A to 12D show test results from application of the first embodiment of the Adaptive Bayes Pattern Recognition system on simulated data in Test Case 3.

FIGS. 15A to 15D show test results from application of the second embodiment of the Adaptive Bayes Pattern Recognition system on simulated data.

Figure 1:
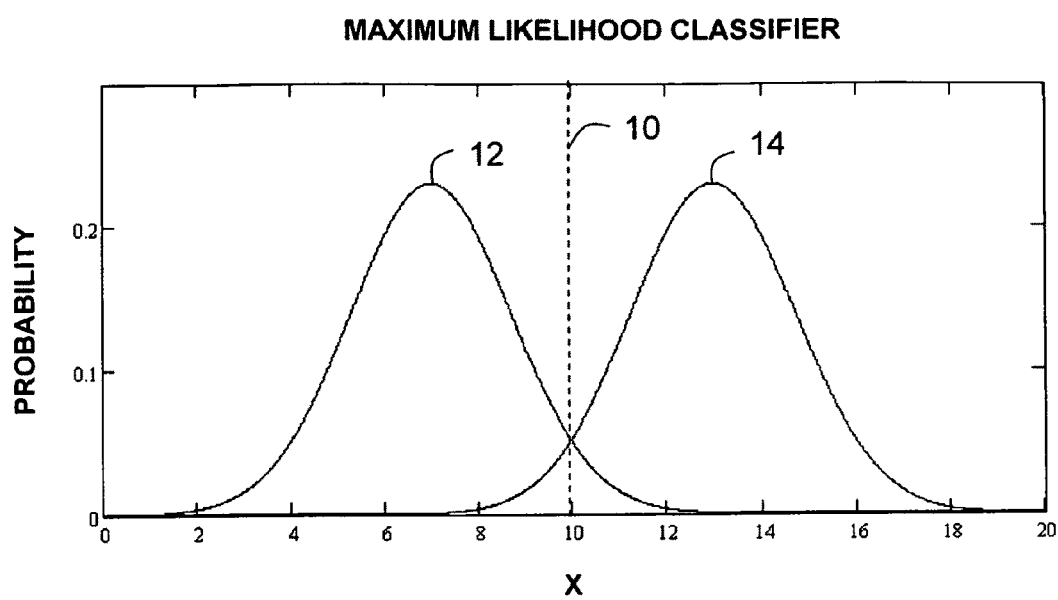
FIG. 1 is a plot illustrating maximum likelihood classification using two class-conditional Gaussian probability density functions.
Figure 2:
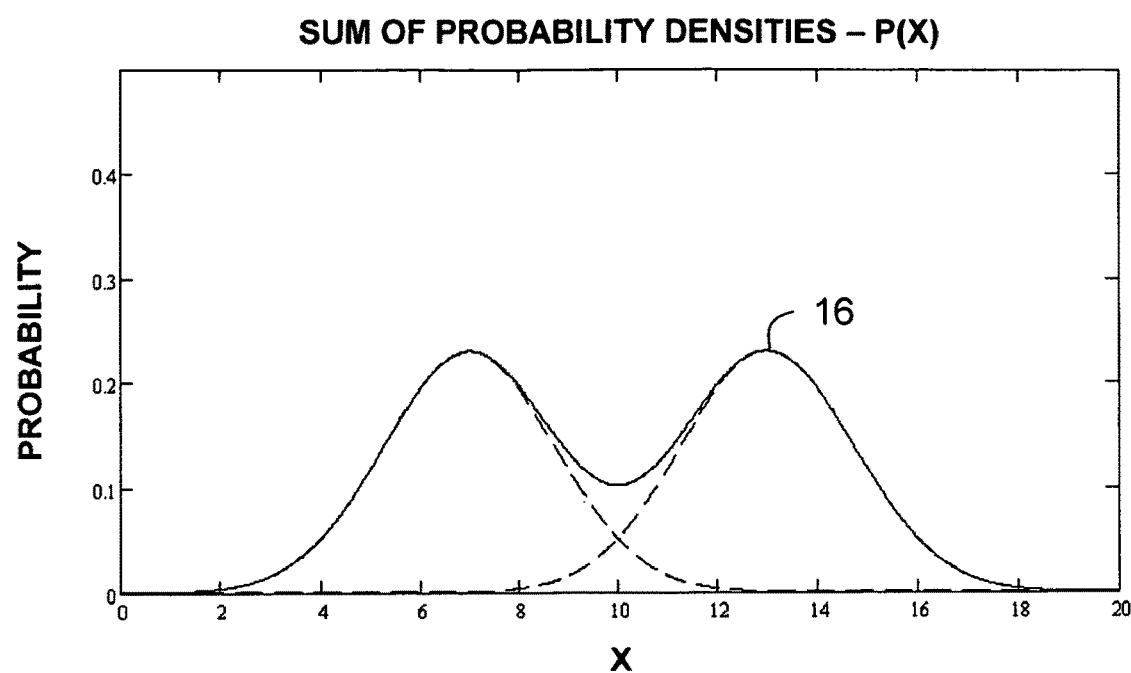
FIG. 2 is a plot illustrating the unconditional probability density function, P(X), which is the sum of two Gaussian distributions.
Figure 3:
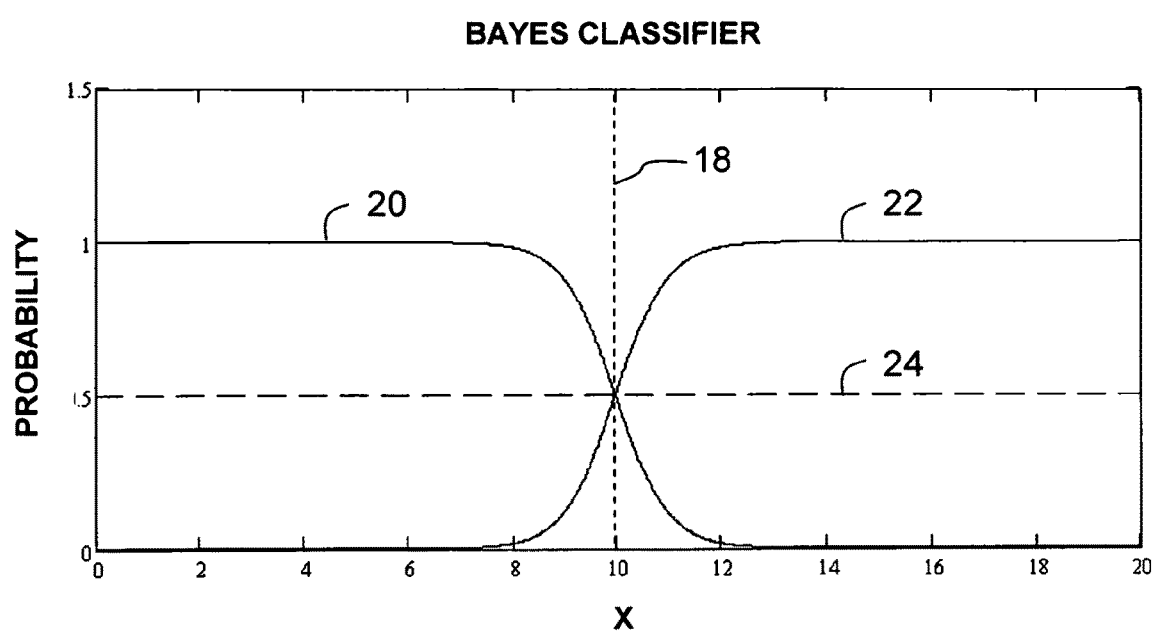
FIG. 3 is a plot illustrating Bayes decision rule using two class-conditional posterior probability distribution functions.
Figure 4:
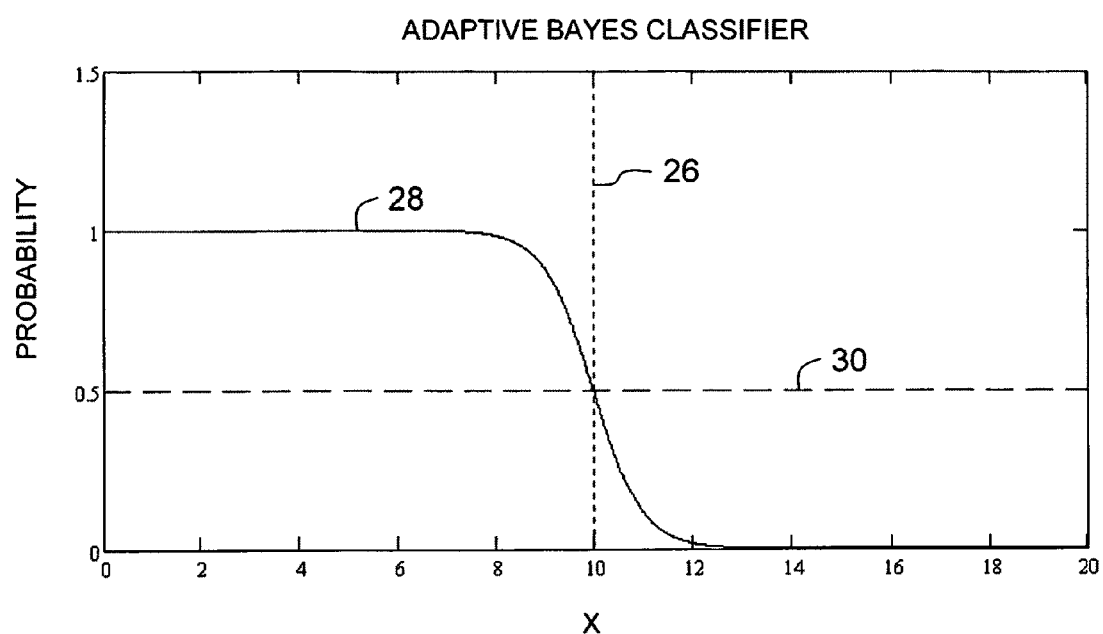
FIG. 4 is a plot illustrating the adaptive Bayes decision rule using the class-of-interest conditional posterior distribution function.
Figure 5:
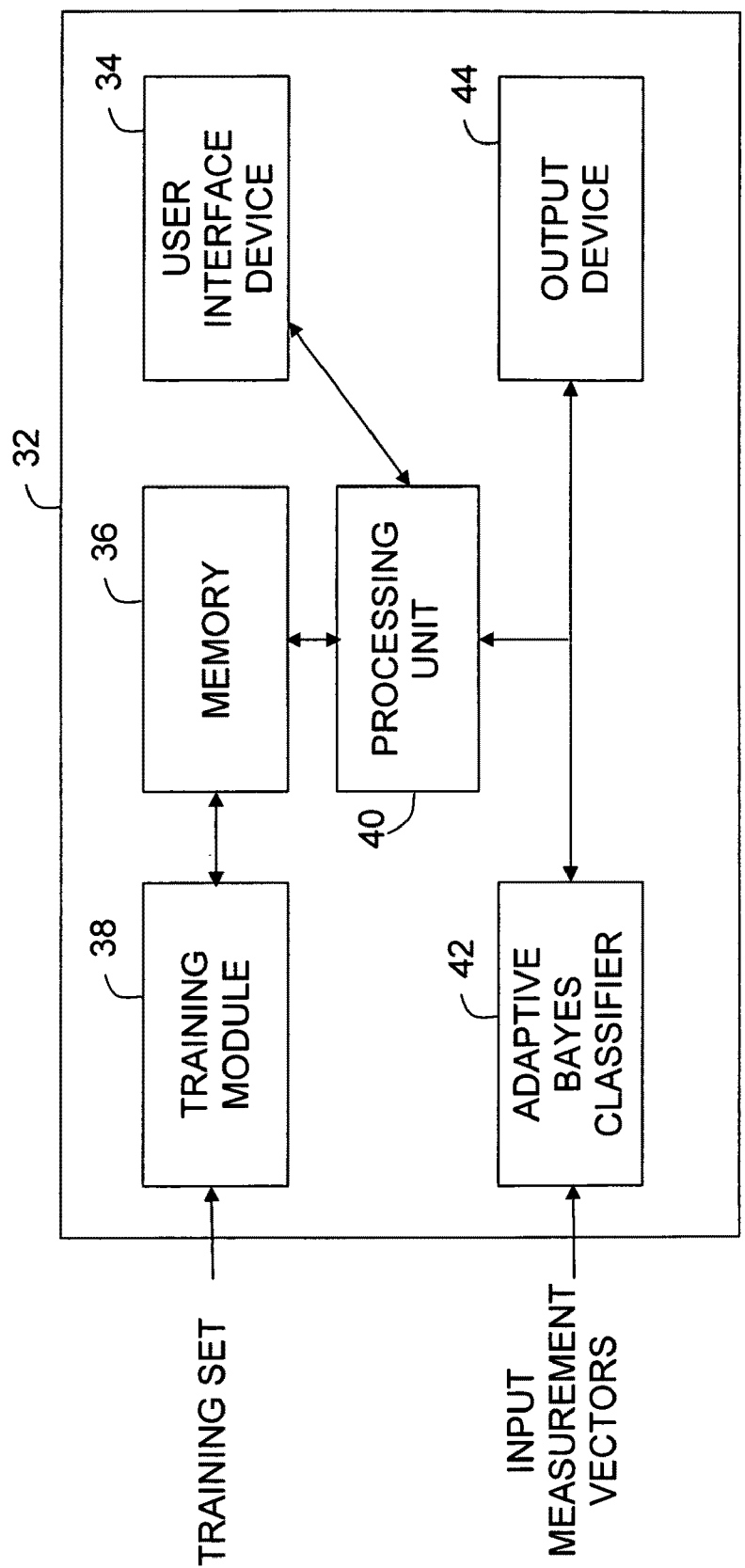
FIG. 5 is a block diagram for an Adaptive Bayes Pattern Recognition system, including its components, for the preferred embodiment.

DRAWINGS—REFERENCE NUMERALS 10 decision boundary for two class maximum likelihood classifier
12 class-of-interest conditional probability density function
14 class-other conditional probability density function
16 unconditional conditional probability density function for sum of two classes
18 decision boundary for two class Bayes classifier
20 class-of-interest posterior distribution function
22 class-other posterior distribution function
24 decision threshold for two class Bayes classifier
26 decision boundary for adaptive Bayes classifier
28 class-of-interest posterior distribution function
30 decision threshold for adaptive Bayes classifier
32 processing flow diagram for the Adaptive Bayes Pattern Recognition system
34 user interface device
36 memory
38 training module
40 processing unit
42 adaptive Bayes classifier
44 output device
46 3D plot of the Parzen estimate of the probability density function for two Gaussians
48 class-other simulated data and probability error ellipse
50 class-of-interest simulated data and probability error ellipse
52 module for selecting samples to serve as mean vectors of kernels
54 module for calculating value for kernel smoothing parameter
56 module for calculating kernel weighting parameters
58 class-of-interest posterior probability calculator
60 adaptive Bayes decision module
62 decision boundary for adaptive Bayes classifier
64 Parzen kernels estimate of class-of-interest posterior distribution function
66 true class-of-interest posterior distribution function
68 decision threshold for adaptive Bayes classifier
70 class-other simulated data and error ellipse for Test Case 1
72 adaptive Bayes classifier decision boundary for Test Case 1
74 class-of-interest simulated data and error ellipse for Test Case 1
76 class-other simulated data and error ellipse for Test Case 1
78 Gaussian maximum likelihood classifier decision boundary for Test Case 1
80 class-of-interest simulated data and error ellipse for Test Case 1
82 adaptive Bayes classification performance for Test Case 1
84 Gaussian maximum likelihood classification performance for Test Case 1
86 class-of-interest simulated data and error ellipse for Test Case 2
88 class-other simulated data and error ellipse for Test Case 2
90 adaptive Bayes classifier decision boundary for Test Case 2
92 class-of-interest simulated data and error ellipse for Test Case 2
94 Gaussian maximum likelihood classifier decision boundary for Test Case 2
96 class-other simulated data and error ellipse for Test Case 2
98 adaptive Bayes classification performance for Test Case 2
100 Gaussian maximum likelihood classification performance for Test Case 2
102 class-other simulated data and error ellipse for Test Case 3
104 adaptive Bayes classifier decision boundary for Test Case 3
106 class-of-interest simulated data and error ellipse for Test Case 3
108 class-other simulated data and error ellipse for Test Case 3
110 Gaussian maximum likelihood classifier decision boundary for Test Case 3
112 class-of-interest simulated data and error ellipse for Test Case 3
114 adaptive Bayes classification performance for Test Case 3
116 Gaussian maximum likelihood classification performance for Test Case 3
118 calculator for probability that cluster density belongs to class-of-interest
120 cluster labeling decision module
122 class-of-interest posterior probability module
124 adaptive Bayes decision module
126 cluster 1 simulated data and error ellipse
128 cluster 2 simulated data and error ellipse
130 cluster 3 simulated data and error ellipse
132 cluster 4 simulated data and error ellipse
134 cluster 5 simulated data and error ellipse
136 probability that cluster 1 label is class-of-interest
138 probability that cluster 2 label is class-of-interest
140 probability that cluster 3 label is class-of-interest
142 probability that cluster 4 label is class-of-interest
144 probability that cluster 5 label is class-of-interest
146 table of probabilities that clusters are labeled class-of-interest Detailed Description—First Embodiment—FIG. 5

With reference to FIG. 5, an Adaptive Bayes Pattern Recognition system 32 is defined consisting of an adaptive Bayes classifier 42, a training module 38, a processing unit 40, memory 36, a user interface device 34, and an output device 44. The Adaptive Bayes Pattern Recognition system operates to classify input measurement vectors into two classes, the class-of-interest and a class-other. The Adaptive Bayes Pattern Recognition system can be used in a number of applications, such as target recognition, classifying remote sensing image, and face detection, where the members of the two classes can be represented in measurement vectors.

A mathematical description for the overall operation of the Adaptive Bayes Pattern Recognition system will be first described. Given labeled sample from a class-of-interest and unlabeled samples from an input-data-set, the least squares criterion, eq. (12), is minimized to obtain an approximation of the class-of-interest posterior distribution function using a set of weighted Parzen kernel densities. The Parzen kernel method of estimating density functions is a well-known and much studied technique for nonparametric density estimation [R. O. Duda and P. E. Hart, *Pattern Classification and Scene Analysis*, New York: John Wiley & Sons, 1973, pp. 88-95]. The need for nonparametric techniques stems from a wide range of applications in which the experimenter is unwilling to assume a parametric family for the true underlying probability density function. The basic foundation for nonparametric density estimation was Fix and Hodges' original work [E. Fix and J. L. Hodges, "Discriminatory analysis, nonparametric discrimination," U. S. Air Force School of Aviation Medicine, Randolph Field, Tex Project 21-49-004, Rep. 4, Contract AF-41-(128)-31, February 1951]. They based their results on the concept that the value of a density function at a point can be estimated using the number of sample observations that fall within a small region around that point.

Rosenblatt [M. Rosenblatt, "Remarks on some nonparametric estimates of a density function," *Ann. Math. Statist.*, vol 27, pp.832-837, 1956], Whittle [P. Whittle, "On the smoothing of probability density functions," *J. Roy. Statist.*, Ser B, vol. 20, pp. 334-343, 1958], Parzen [17], and Cacoullos [T. Cacoullos, "Estimation of a multivariate density," *Ann. Inst. Statist. Math.*, vol. 18, pp. 179-189, 1966] generalized these results and developed the Parzen kernel class of estimators. Conditions on the kernel function were derived to ensure asymptotically unbiased, and uniformly consistent estimators.

Given R samples, $S=\{X_1, X_2, \ldots X_R\}$ drawn from a population with the density function, $P(X)$, of the input-data-set, the Parzen density estimate of the unknown probability function, $\hat{P}(X)$, is defined as $$\hat{P}(X) = \frac{1}{R}\sum_{i=1}^{R} \frac{1}{h} K\left(\frac{X-X_i}{h}\right) \quad (35)$$

where $K(\circ)$ is a window or kernel function and h is the window width, smoothing parameter, or simply the kernel size of kernel $K_i$. The samples in the set $S=\{X_1, X_2, \ldots X_R\}$ are used as the kernels for $K_i$.

For this application, it is convenient to assume a d-dimension Gaussian form for kernels, or $$\hat{P}(X/k_i) = \frac{1}{2\pi^{d/2}|H|^{1/2}} e^{-1/2(X-X_i)^T H^{-1}(X-X_i)} \quad (36)$$

where H is the kernel smoothing parameter. H is defined as $$H = \begin{bmatrix} h_{11}^2 & \cdots & h_{1d}^2 \\ \vdots & \ddots & \vdots \\ h_{d1}^2 & \cdots & h_{dd}^2 \end{bmatrix} \quad (37)$$

This expanded form of the smoothing parameter accounts for both measurement scaling and correlation between the measurements. A procedure for estimating H will be defined later.

The multi-dimensional Parzen density estimate at X is defined as $$\hat{P}(X) = \frac{1}{R}\sum_{i=1}^{R} \hat{P}(X/k_i) \quad (38)$$

A modified Parzen kernel estimator will be used to approximate the class-of-interest posterior distribution, $P(C_{int}/X)$. Specifically, we will approximate the posterior distribution function using, $A^T F(X)$, as follows:

The functions-of-the-measurements, $f(X)_i$, eq. (23), are defined as $$f(X)_i = \frac{P(X/k_i)}{P(X)} \quad (39)$$

The vector, F(X) is then defined as $$F(X) = \left[\frac{P(X/k_1)}{P(X)}, \frac{P(X/k_2)}{P(X)}, \ldots \frac{P(X/k_R)}{P(X)}\right]^T \quad (40)$$

The parameters of the weighting vector, A, are defined as $$A=(a_1, a_2, \ldots a_R)^T \quad (41)$$

Taking the product of $A^T F(X)$, we get $$A^T F(X) = a_1 \frac{P(X/k_1)}{P(X)} + a_2 \frac{P(X/k_2)}{P(X)} \ldots + a_R \frac{P(X/k_R)}{P(X)} \quad (42)$$

or $$A^T F(X) = \sum_{i=1}^{R} a_i \frac{P(X/k_i)}{P(X)} \quad (43)$$

Thus, $A^T F(X)$ is seen to be weighted linear combination of Parzen kernels weighted by $(a_1, a_2, \ldots a_R)$ and by $1/P(X)$. The weighting vector $A=(a_1, a_2, \ldots a_R)^T$ is estimated using the least squares estimator, eq. (28), and P(X) is defined in eq. (38).

One advantage of using Parzen kernels is that the probability estimates provided by Parzen kernels are less impacted by high dimension measurement vectors. Increasing the number of features causes a small increase in the number of computations required to compute a value for the conditional probability $\hat{P}(X/k_i)$, eq. (36). This allows us to construct adaptive Bayes classifiers for high dimension data with reduced risk of the numerical computation problems that are associated with polynomial approximations of the class-of-interest posterior distribution function, $F(C_{int}/X)$. The number of computations required to compute a probability estimate using Parzen kernels is mostly a function of the number of kernels used to approximate a probability density function. The numerical computation errors associated with matrix inversion only become a problem when large numbers of Parzen kernels are used to approximate a probability density function.

Estimating Smoothing Parameter H—FIG. 6

A number of authors have studied the problem of determining a value for the Parzen smoothing parameter h in eq. (35). Fukunaga [K. Fukunaga, D. M. Hummels, "Bayes Error Estimation Using Parzen and k-NN Procedures", IEEE Transactions on Pattern Analysis and Machine Intelligence, Vol. PAMI-9, Number 5, September 1987, p. 634-643] evaluated a least squares approach for estimating h. However, Fukunaga's least square estimator of h is not directly related to the set of kernels selected and was shown to provide inconsistent results.

U.S. Pat. No. 6,317,517, issued to Liang, et al., disclosed a method for using classification accuracy as a means for selecting an optimal value for smoothing parameter h. However this approach requires that training samples be available for all the classes.

Jones [M. C. Jones and D. A. Henderson, "Maximum likelihood kernel density estimation," Technical Report 05/01, Department of Statistics, Open University] and Grim [J. Grim, J. Novovicova, P. Pudil, and P. Somol, "Initialing Normal Mixtures of Densities," Proceedings of the 14th International Conference on Pattern Recognition—Volume 1, p. 886, 1998] proposed an approach for estimating a multi-variant kernel smoothing parameter H, eq. (37), using maximum likelihood estimation. They used the well known log-likelihood function for finite mixtures [R. O. Duda and P. E. Hart, *Pattern Classification and Scene Analysis*, New York: John Wiley & Sons, 1973, pp. 189-201] to estimate an optimal smoothing parameter for the unknown density. In particular, a smoothing parameter $H_i$, was estimated for each component of the kernel density, $K_i$, i=1 ... R, using an iterative equation. An optimal smoothing parameter, H, was obtained for the unknown density function by computing a weighted average of the individual kernels $H_i$'s. This procedure provides useful results but is computationally intensive.

An alternative maximum likelihood kernel density estimation technique is presented below which uses an iterative technique to provide an estimate for H which is common to all kernels.

One interpretation of the kernel density estimator is that it is a special case of the mixture density model of the form $$P(X) = \sum_{i=1}^{R} P(k_i) \frac{1}{2\pi^{d/2}|H|^{1/2}} e^{-1/2(X-X_i)^T H^{-1}(X-X_i)} \quad (44)$$

where the data points $S=\{X_1, X_2, \ldots X_R\}$ replace the Gaussian means, $P_{k_i}$ is the prior probability of the kernel, and all the kernels share a common smoothing parameter H.

First, we will let the prior probability of the kernels be $$P_{k_i} = \frac{1}{R} \quad (45)$$

Now, suppose we are given a set $\Psi=\{X_1, X_2, \ldots X_N\}$ of N unlabeled samples drawn independently from the mixture density, P(X|H), which is defined as $$P(X \mid H) = \sum_{i=1}^{R} P_{k_i} P(X \mid k_i, H) \quad (46)$$

and where the smoothing parameter H is fixed but unknown.

The likelihood of the observed samples is by definition the joint probability $$P(\Psi \mid H) = \prod_{j=1}^{N} P(X_j / H) \quad (47)$$

The maximum likelihood estimate of H is that value of $\hat{H}$ that maximizes P(Ψ|H).

Let L be the logarithm of the likelihood, then $$L = \sum_{j=1}^{N} \log P(X_j / H) \quad (48)$$

Differentiating L, eq. (48), with respect to H, we get $$\frac{\delta L}{\delta H} = \sum_{j=1}^{N} \frac{1}{P(X_j/H)} \cdot \frac{\delta P(X_j/H)}{\delta H} \quad (49)$$

$$\frac{\delta P(X/H)}{\delta H} = \sum_{i=1}^{M} P(k_i) \cdot \frac{\Delta P(X/K_i, H)}{\delta H} \quad (50)$$

$$\frac{\delta P(X/k_i, H)}{\delta H} = \frac{\delta}{\delta H} \cdot \left[ \frac{1}{2\pi^{d/2}[H]^{1/2}} e^{-1/2(X-X_i)^T H^{-1}(X-X_i)} \right] \quad (51)$$

$$Q_i = (X-X_i)^T H^{-1}(X-X_i) \quad (52)$$

$$\frac{\delta P(X/k_i, H)}{\delta H} = \frac{1}{2\pi^{d/2}} \cdot \frac{\delta}{\delta H} \cdot \left[ \frac{1}{|H|^{1/2}} e^{-1/2Q} \right] \quad (53)$$

$$\frac{\delta P(X/k_i, H)}{\delta H} = \frac{1}{2\pi^{d/2}} \cdot \left[ e^{-1/2Q} \cdot \frac{\delta |H|^{-1/2}}{\delta H} + \frac{1}{|H|^{1/2}} \cdot e^{-1/2Q} \cdot \left(-\frac{1}{2}\frac{\delta Q}{\delta H}\right) \right] \quad (54)$$

$$\frac{\delta |H|^{-1/2}}{\delta H} = -\frac{1}{2}|H|^{-1/2} \cdot H^{-T} \quad (55)$$

$$\frac{\delta Q_i}{\delta H} = -H^{-T}(X-X_i)(X-X_i)^T H^{-T} \quad (56)$$

Noting that, since H is symmetric, then $$H^{-1} = H^{-T} \quad (57)$$

We get $$\frac{\delta Q_i}{\delta H} = -H^{-1}(X-X_i)(X-X_i)^T H^{-1} \quad (58)$$

Combining terms, we get $$\frac{\delta P(X/k_i, H)}{\delta H} = \frac{1}{2\pi^{d/2}} \cdot \left[ e^{-1/2Q_i} \cdot \frac{1}{2} \right. \tag{59}$$
$$\left. |H|^{-1/2} \cdot H^{-1} + \frac{1}{|H|^{1/2}} \cdot e^{-1/2Q_i} \cdot \left( \frac{1}{2} H^{-1} (X - X_i)(X - X_i)^T H^{-1} \right) \right]$$

$$\frac{\delta P(X/k_i, H)}{\delta H} = \left[ -\frac{1}{2} P(X/k_i, H) \cdot \right. \tag{60}$$
$$\left. H^{-1} + P(X/k_i, H) \cdot \left( \frac{1}{2} H^{-1} (X - X_i)(X - X_i)^T H^{-1} \right) \right]$$

$$\frac{\delta P(X/k_i, H)}{\delta H} = \tag{61}$$
$$P(X/k_i, H) \left[ -\frac{1}{2} \cdot H^{-1} + \frac{1}{2} H^{-1} (X - X_i)(X - X_i)^T H^{-1} \right]$$

$$\frac{\delta P(X/H)}{\delta H} = \tag{62}$$
$$\sum_{j=1}^{N} P_{k_i} \cdot P(X/k_i, H) \left[ -\frac{1}{2} \cdot H^{-1} + \frac{1}{2} H^{-1} (X - X_i)(X - X_i)^T H^{-1} \right]$$

And finally, setting the partial derivative of the log likelihood function with respect to the smoothing parameter H equal to zero, we get $$\frac{\delta L}{\delta H} = \sum_{j=1}^{N} \sum_{i=1}^{M} \frac{P_{k_i} \cdot P(X_j/k_i, H)}{P(X_j/H)} \left[ -\frac{1}{2} \cdot H^{-1} + \right. \tag{63}$$
$$\left. \frac{1}{2} H^{-1} (X_j - X_i)(X_j - X_i)^T H^{-1} \right] = 0$$

$$\sum_{j=1}^{N} \sum_{i=1}^{M} \frac{P_{k_i} \cdot P(X_j/k_i, H)}{P(X_j/H)} H^{-1} = \tag{64}$$
$$\sum_{j=1}^{N} \sum_{i=1}^{M} \frac{P_{k_i} \cdot P(X_j/k_i, H)}{P(X_j/H)} \left[ \frac{1}{2} H^{-1} (X_j - X_i)(X_j - X_i)^T H^{-1} \right]$$

Solving eq. (64) for H, we obtain the following maximum likelihood estimate for H $$H = \sum_{j=1}^{N} \sum_{i=1}^{M} \frac{P_{k_i} \cdot P(X_j/k_i, H)}{P(X_j/H)} \cdot \left[ \frac{1}{2} (X_j - X_i)(X_j - X_i)^T \right] \tag{65}$$

Eq. (65) is an iterative maximum likelihood estimator for the smoothing parameter, H. Given an initial value of $H_0$, an updated value is obtained for H using eq. (65). The log likelihood function, eq. (48), is evaluated after each update to H. This process is repeated until there is no further change in the log likelihood function, eq. (48).

Figure 6A:
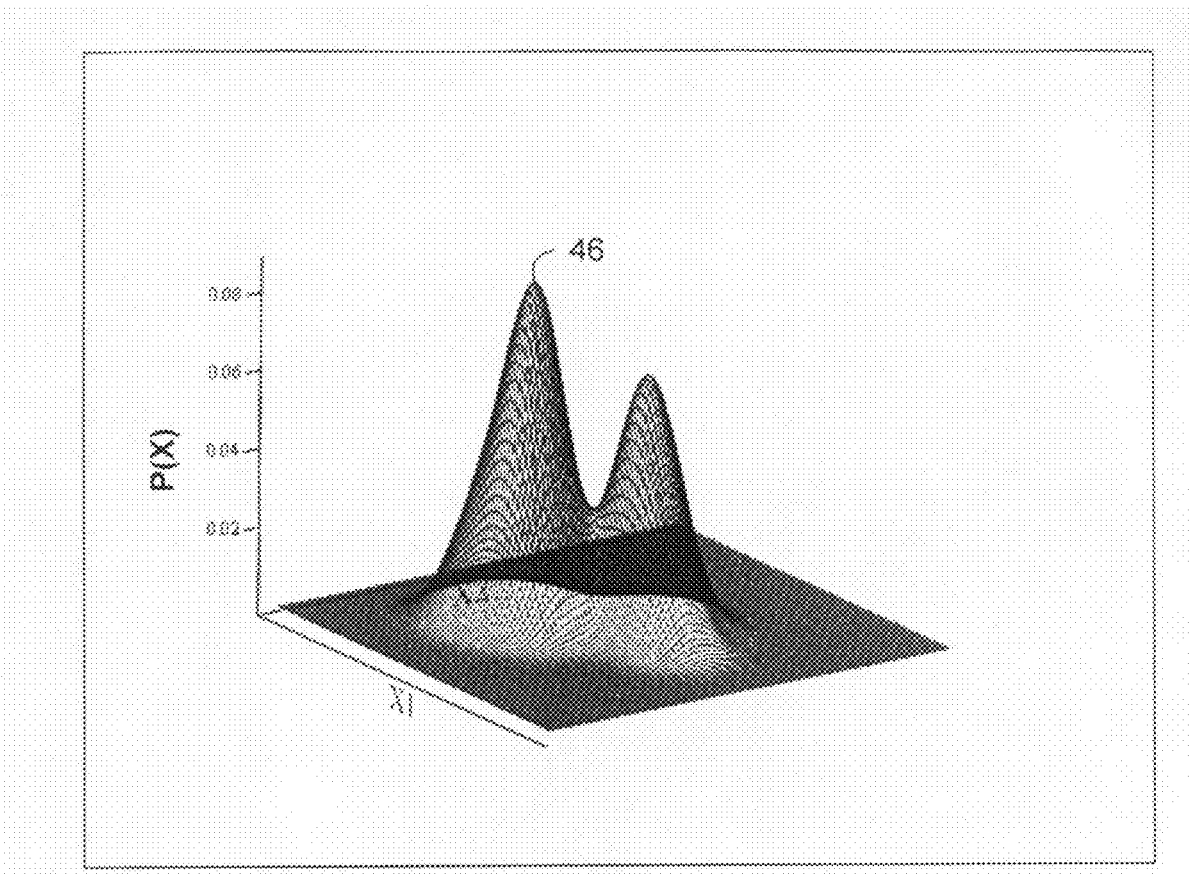
Figure 6B:
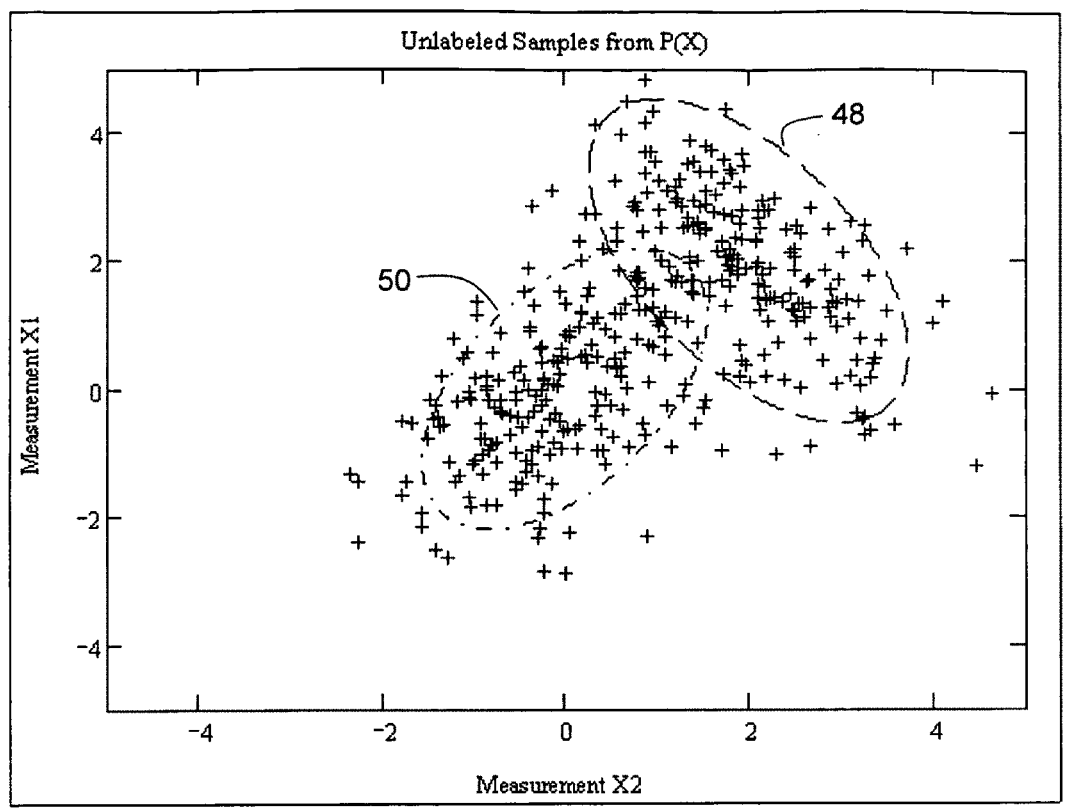

With reference to FIG. 6A, results are shown for a Parzen kernel approximation of the sum of two bi-variant Gaussian density functions 46 using the maximum likelihood estimate of H, eq. (65), and the Parzen kernel estimator for P(X), eq. (38). Twenty kernels were used in the kernel estimator for P(X) 46. FIG. 6C, shows the generating statistics for the two Gaussian distributions. Referencing FIG. 6B, a total of 200 samples were generated from each Gaussian density function, 48 and 50, as shown in scatter plot. Again referencing FIG. 6A, it can be seen that the Parzen kernel estimator using H, provides an accurate estimate of the two bi-variant probability density functions 46.

Figure 7:
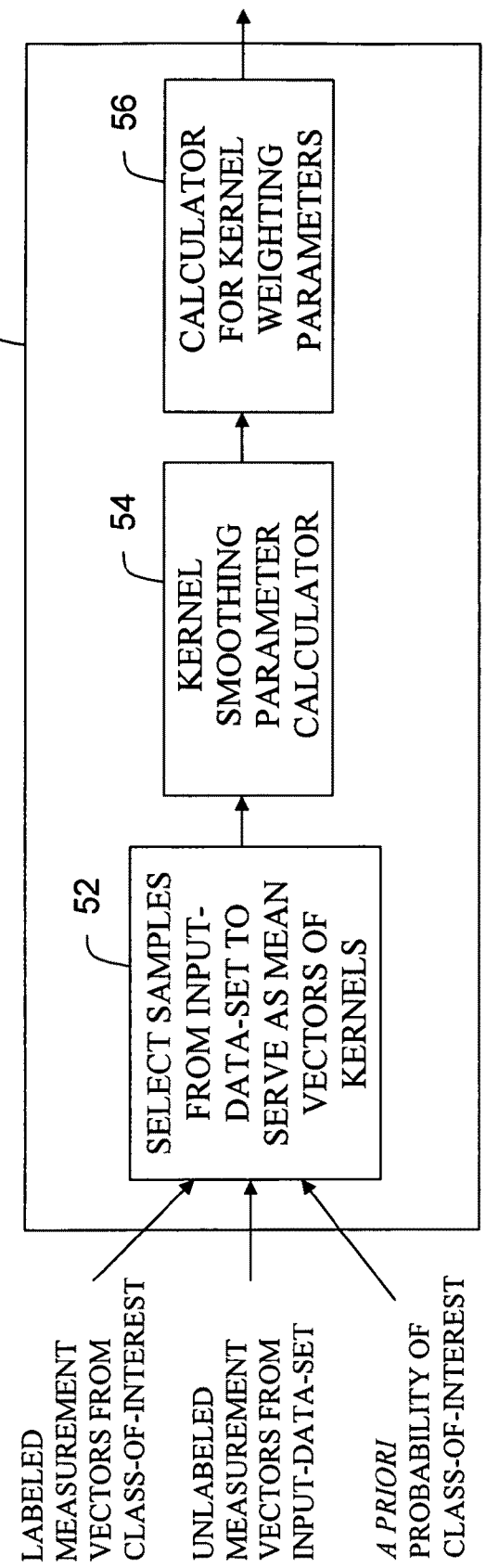
FIG. 7 is the processing flow diagram for the training module for the first embodiment of the Adaptive Bayes Pattern Recognition system.
Figure 8:
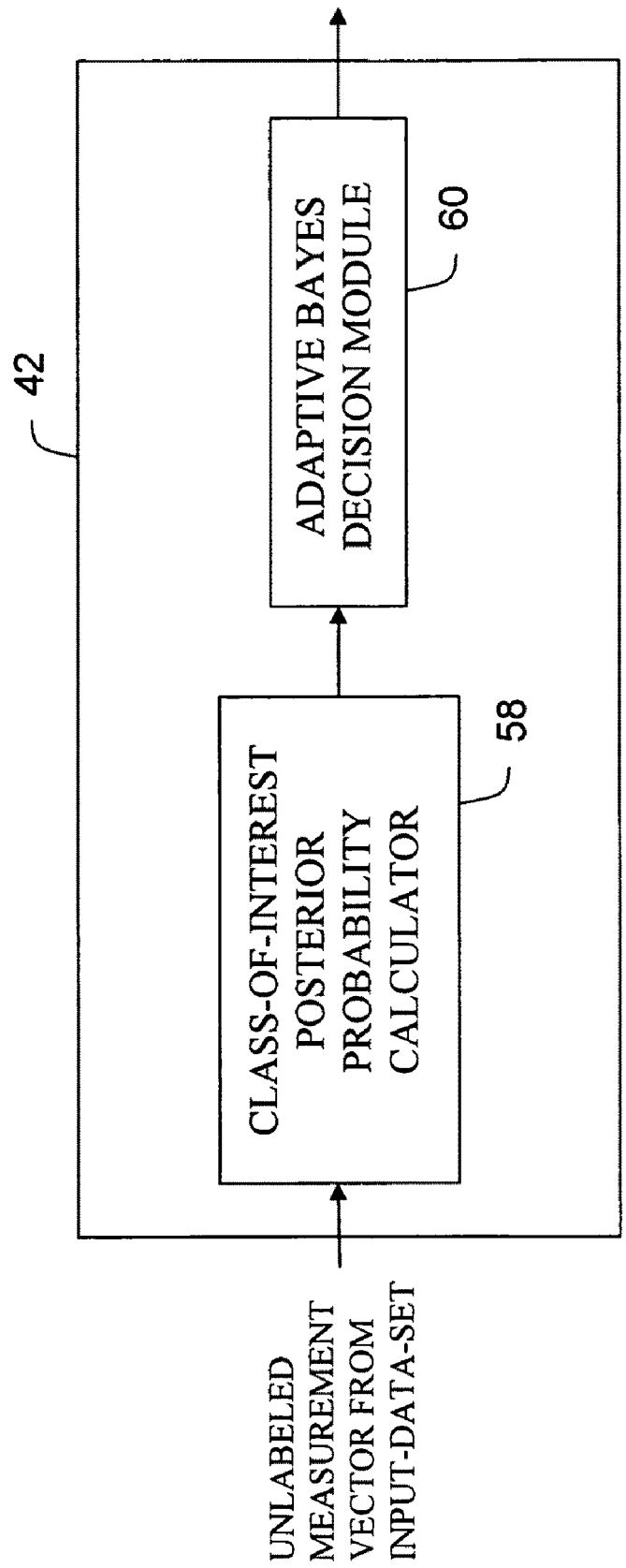
FIG. 8 is the processing flow for the adaptive Bayes classifier for the first embodiment of the Adaptive Bayes Pattern Recognition system.
Figure 9:
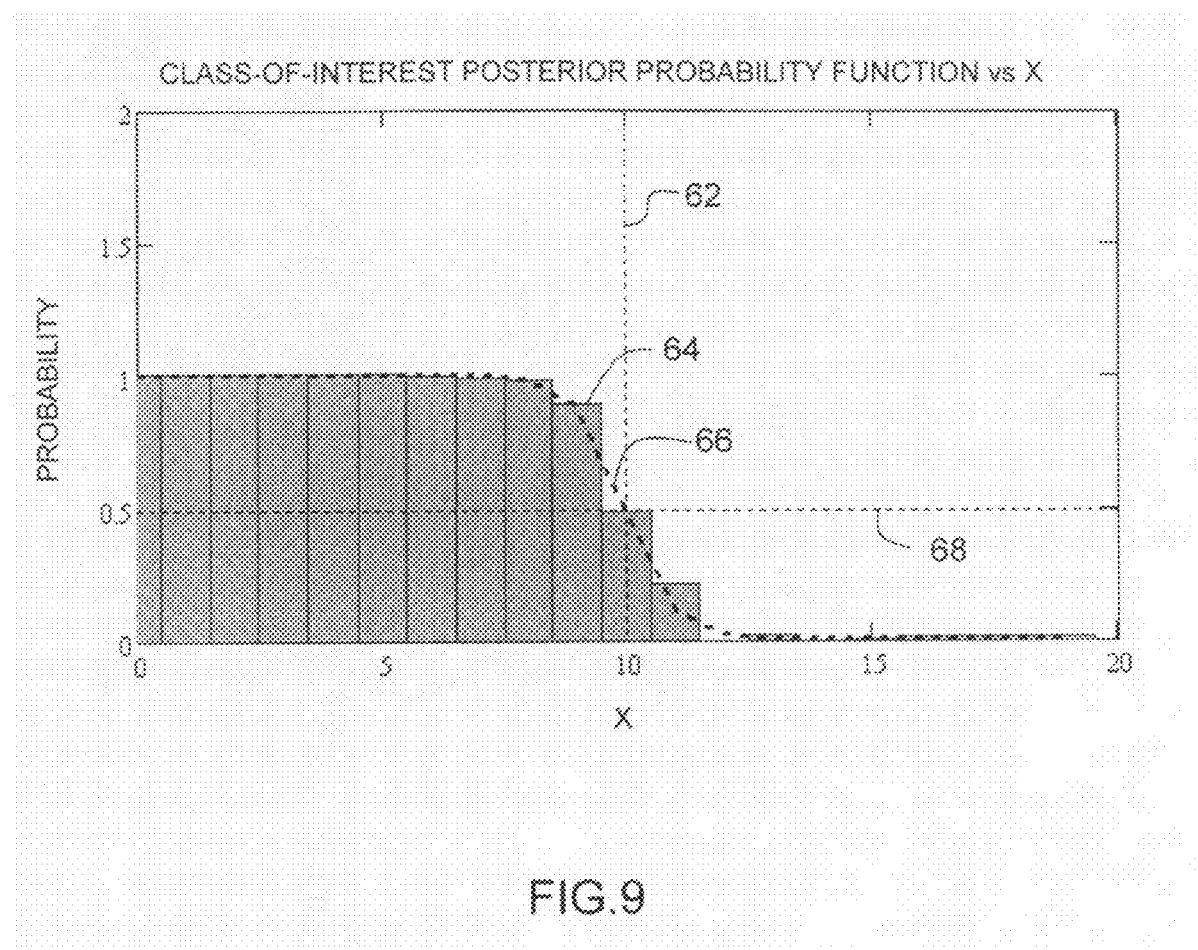
FIG. 9 is a plot of illustrating the approximation of class-of-interest posterior distribution function using Parzen kernels.

Operation—First Embodiment—FIGS. 7, 8, and 9

With reference to FIG. 7, the off-line method begins with step 52, in which a set of R unlabeled samples, S={$X_1$, $X_2$, ... $X_R$}, are randomly selected from the input-data-set. These samples are used as the mean vectors of the Parzen kernels.

Again referencing FIG. 7, in step 54 the smoothing parameter, H, is estimated using the maximum likelihood estimator, $$\hat{H} = \sum_{j=1}^{N} \sum_{i=1}^{R} \frac{P_{k_i} \cdot P(X_j/k_i)}{P(X_j)} \cdot \left[ \frac{1}{2} (X_j - X_i)(X_j - X_i)^T \right] \tag{66}$$

Given an initial value for $H_0$, an updated value is obtained for H. The log likelihood function, eq. (48), is evaluated after each update to H. This process is repeated until there is no further improvement in the log likelihood function, eq. (48).

Again referencing FIG. 7, in step 56, the weighting vector for the Parzen kernels, A=($a_1$, $a_2$, ... $a_R$)$^T$, is estimated using M labeled samples from the class-of-interest ($X_1(C_{int})$, $X_2(C_{int})$, ... $X_M(C_{int})$) and N unlabeled samples from the input-data-set, ($X_1$, $X_2$, ... $X_N$). The a priori probability, $P_{C_{int}}$, is assumed to be known. The weighting vector A=($a_1$, $a_2$, ... $a_M$)$^T$, is computed as follows $$A = P_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))] \tag{67}$$

where the vector F(X) is defined as $$F(X) = \left[ \frac{P(X/k_1)}{P(X)}, \frac{P(X/k_2)}{P(X)}, \ldots \frac{P(X/k_R)}{P(X)} \right]^T \tag{68}$$

and $$P(X/k_i) = \frac{1}{2\pi^{d/2}|H|^{1/2}} e^{-1/2(X-X_i)^T H^{-1}(X-X_i)} \tag{69}$$

and $$P(X) = \frac{1}{R} \sum_{i=1}^{R} P(X/k_i) \tag{70}$$

Referencing FIG. 8, the on-line method begins with step 58, where the class-of-interest posterior probability, $P(C_{int}/X)$, is estimated using, $A^T F(X)$, eq. (43), for a measurement vector from the input-data-set. Again referencing FIG. 8, in step 60 the measurement vector is classified as either class-of-interest or class-other using the adaptive Bayes decision rule, or If: $A^T F(X) \geq \frac{1}{2}$, (71)

Classify X as the class-of-interest
Otherwise, classify X as class-other
where the vector A=($a_1$, $a_2$, ... $a_R$)$^T$ is computed using eq. (67) and the vector F(X) is computed for each measurement vector from the input-data-set as $$F(X) = \left[ \frac{P(X/k_1)}{P(X)}, \frac{P(X/k_2)}{P(X)}, \ldots \frac{P(X/k_R)}{P(X)} \right]^T \quad (72)$$

where $P(X|k_j)$ and $P(X)$ are defined in eq. (36) and eq. (38), respectively.

Adaptive Bayes Pattern Recognition System Test Results

Results from four tests of the Adaptive Bayes Pattern Recognition system are presented below. These test cases are designed to demonstrate the robust and powerful discrimination capabilities provided by the Adaptive Bayes Pattern Recognition system.
Example of Parzen Kernel Approximations of the Class-of-Interest Posterior Distribution Function $\hat{P}(C_{int}/X)$ Referencing FIG. 9, shown is a uni-variate approximation of the class-of-interest posterior distribution, $\hat{P}(C_{int}/X)$, 64 using the Adaptive Bayes Pattern Recognition system. The class-of-interest posterior distribution 64 was approximated using ten Parzen kernels, with the weighting parameters, $A = (a_1, a_2, \ldots a_M)^T$, estimated using 100 labeled samples of simulated data from the class-of-interest, and 200 unlabeled samples of simulated data from the class-of-interest and class-other density functions. The smoothing parameter, H, was estimated using the maximum likelihood estimator, eq. (66). The true class-of-interest posterior distribution 66 is plotted for comparison. The values of the class-of-interest posterior distribution function $\hat{P}(C_{int}/X)$ 64 were estimated at various points along the measurement axis using $A^T F(X)$, eq. (43). It can be seen that the kernel estimator for $\hat{P}(C_{int}/X)$ 64 closely approximates the true posterior distribution 66. The decision boundary 62 is located at the point where $\hat{P}(C_{int}/X) = 0.5$ 68. The density function parameters in FIG. 8 are $\mu_{C_{int}} = 7$, $\mu_{C_{other}} = 13$, $\sigma^2_{C_{int}} = 3$, and $\sigma^2_{C_{other}} = 3$. The prior probabilities are $P_{C_{int}} = 0.5$ and $P_{C_{other}} = 0.5$.
Performance Evaluation of the Adaptive Bayes Pattern Recognition System on Simulated Data—FIGS. 10, 11 and 12

The performance of the Adaptive Bayes classification algorithm using Parzen kernels is compared to the performance of the standard Gaussian maximum likelihood classifier using simulated data in three test cases. The same data is used for both training and test. In these tests, the class-of-interest posterior distribution function was estimated using twenty Parzen kernels. In addition, the adaptive Bayes decision boundary was estimated using only labeled samples from the class-of-interest $P(X/C_{int})$ and the unlabeled samples from the input-data-set, $P(X)$.

The Gaussian maximum likelihood classification results provide a benchmark to compare the performance of the adaptive Bayes classification algorithm against. The Gaussian maximum likelihood classifier uses estimated class statistics (estimated means and covariances) in classifying the data. Classification accuracies are evaluated using labeled samples. In these examples, the prior probabilities of the class-of-interest and the other-class are assumed to be known.

The results from the three test cases are shown in FIGS. 10, 11 and 12.

FIGS. 9D, 10D, and 11D, show the statistics of the Gaussian density functions used to generate the simulated data used in the three test cases. Two hundred samples were generated from each Gaussian density function.

Figure 10A:
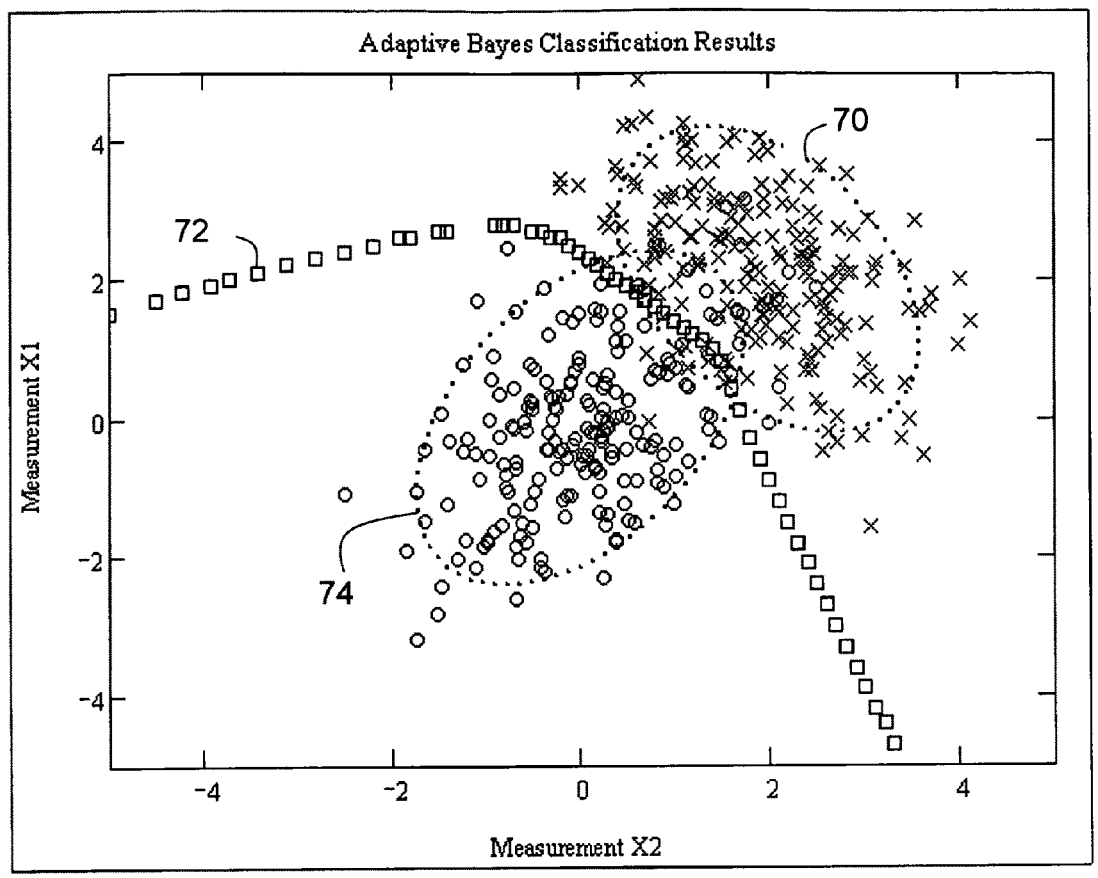
Figure 11A:
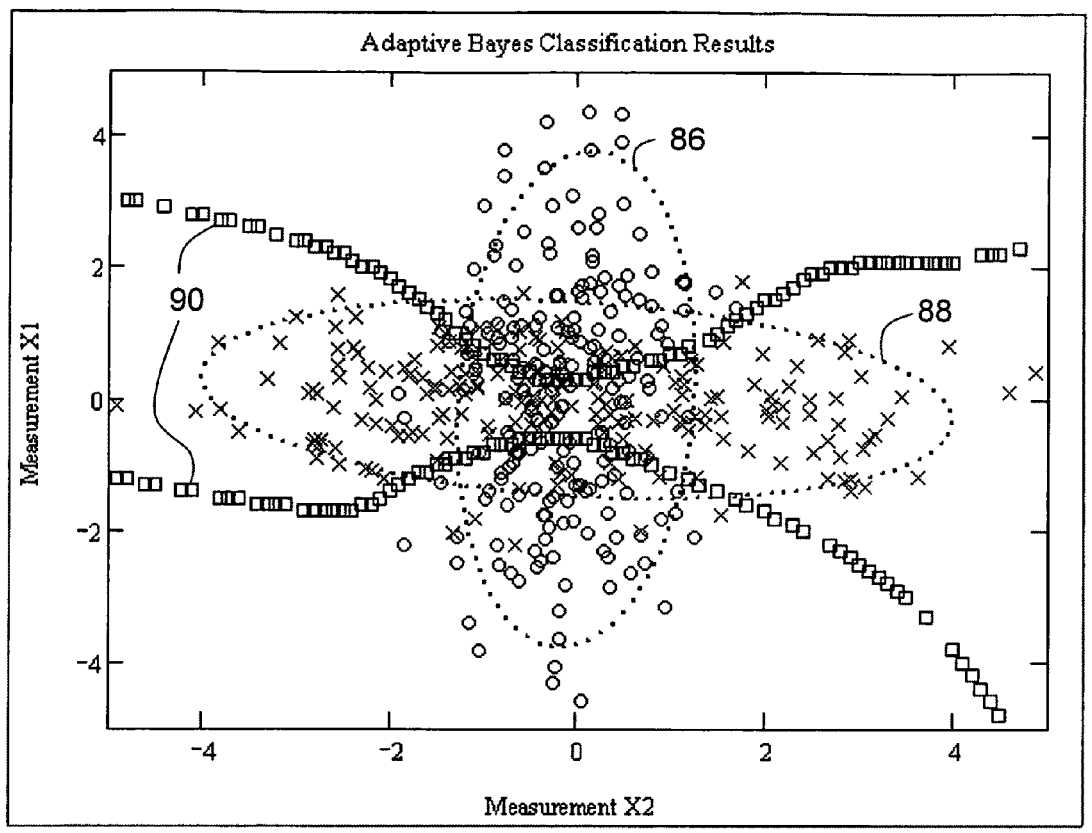
Figure 12A:
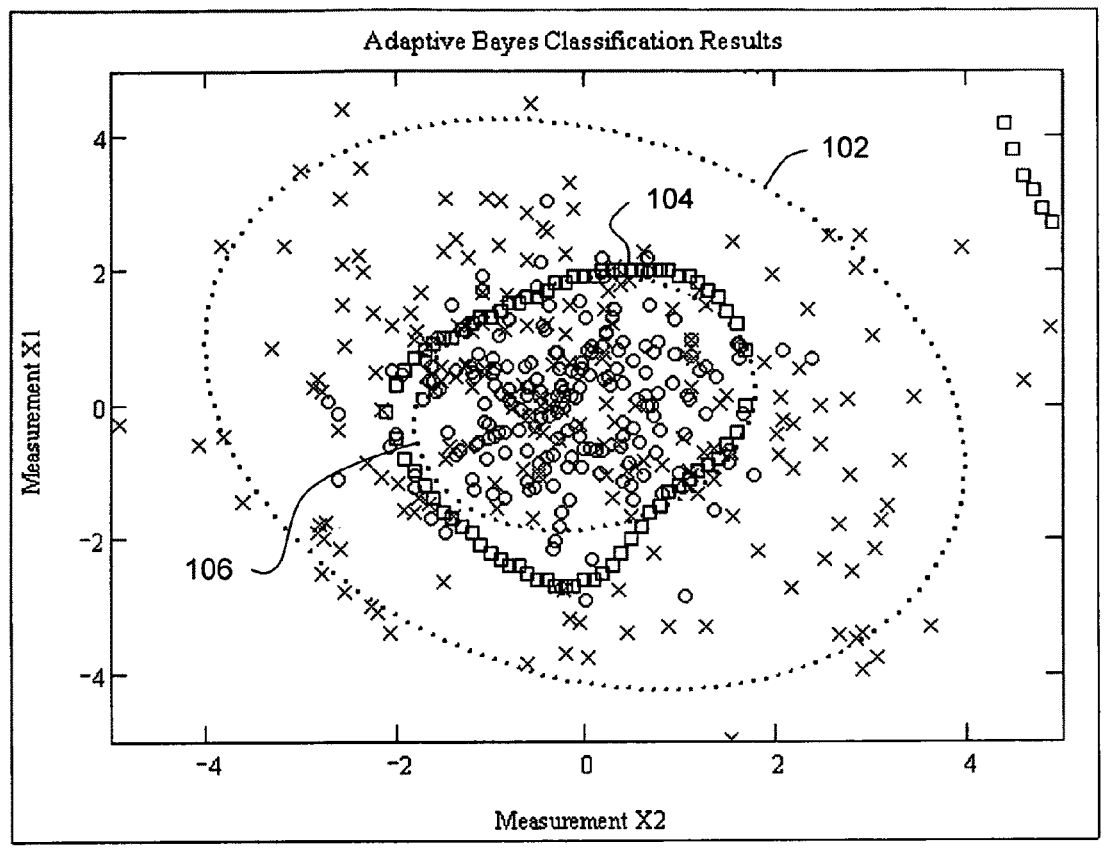

FIGS. 10A, 11A, and 12A show the decision boundaries estimated by the adaptive Bayes classifier using Parzen kernels, 72, 90, and 104. Also shown in FIGS. 10A, 11A, and 12A are plots of the simulated data for the class-of-interest, 74, 86, and 106, and plots of the simulated data for class-other, 70, 88, and 102.

Figure 10B:
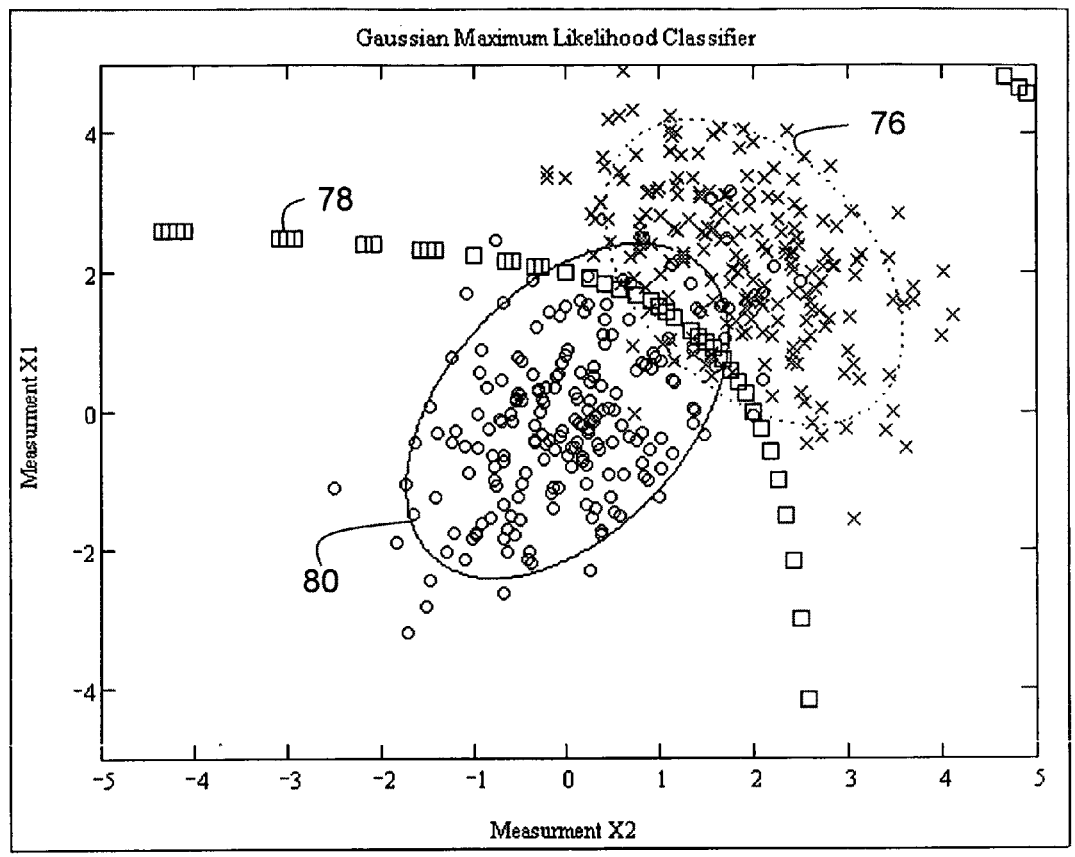
Figure 11B:
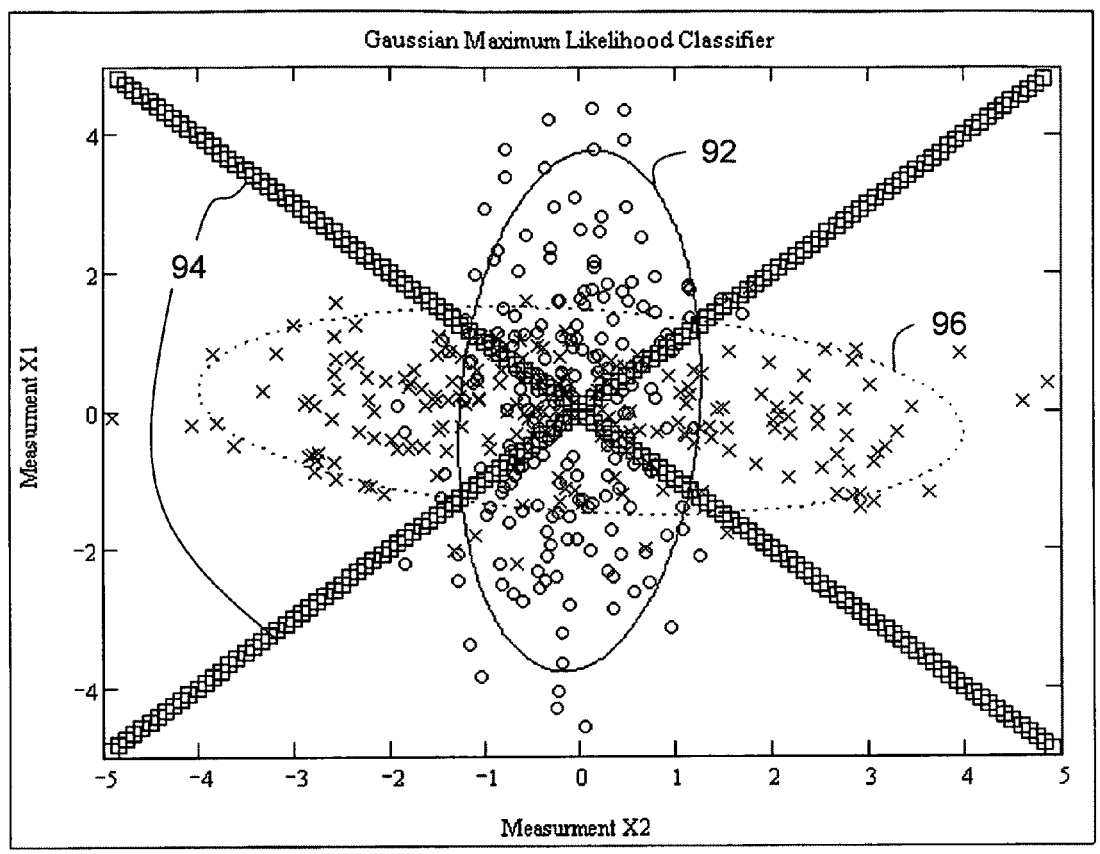
Figure 12B:
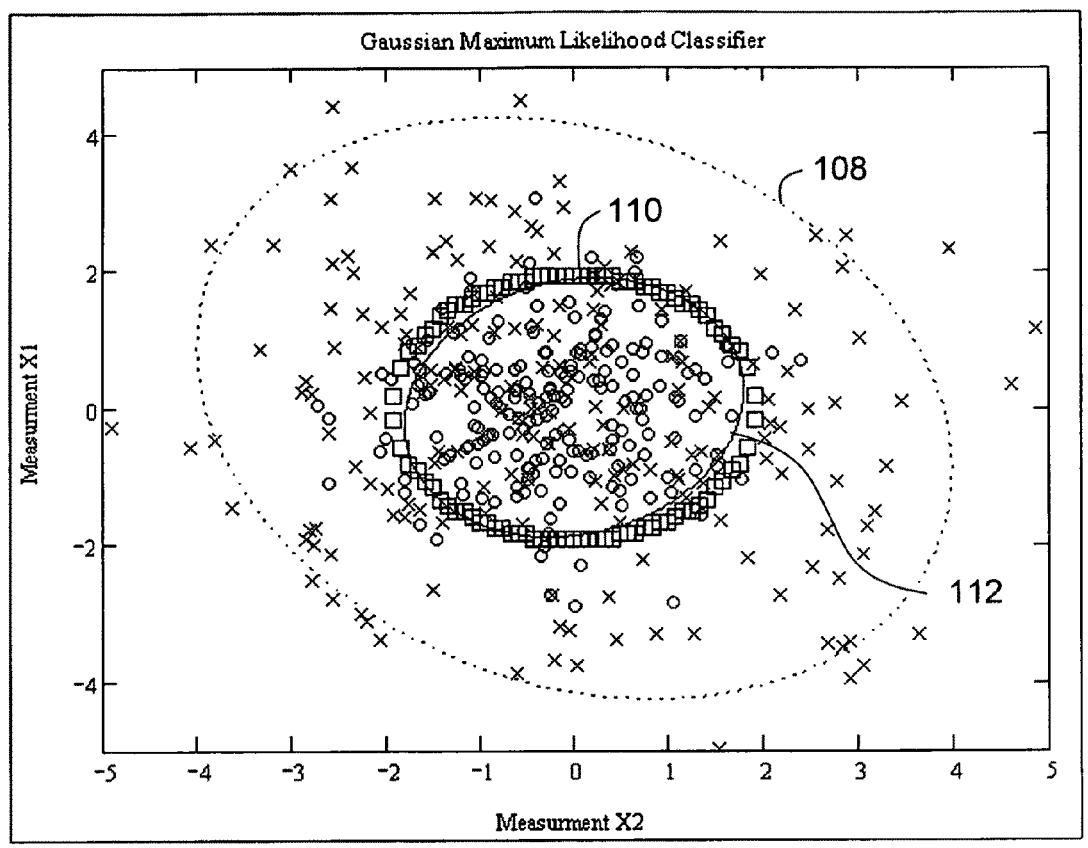

FIGS. 10B, 11B, and 12B, show the decision boundaries estimated by the Gaussian Maximum Likelihood Classifier, 78, 94, and 110. Also shown in FIGS. 10B, 11B, and 12B are plots of the simulated data for the class-of-interest, 80, 92, and 112, and plots of the simulated data for class-other, 76, 96, and 108.

A comparison of the decision boundaries for the Adaptive Bayes classifier 72, 90, and 104, and the Gaussian maximum likelihood classifier, 78, 94, and 110, shows that they are very similar in the region where the two density functions overlap. Since the Adaptive Bayes classifier is non-parametric, it is not expected to duplicate the Gaussian maximum likelihood decision boundary.

Figure 10C:
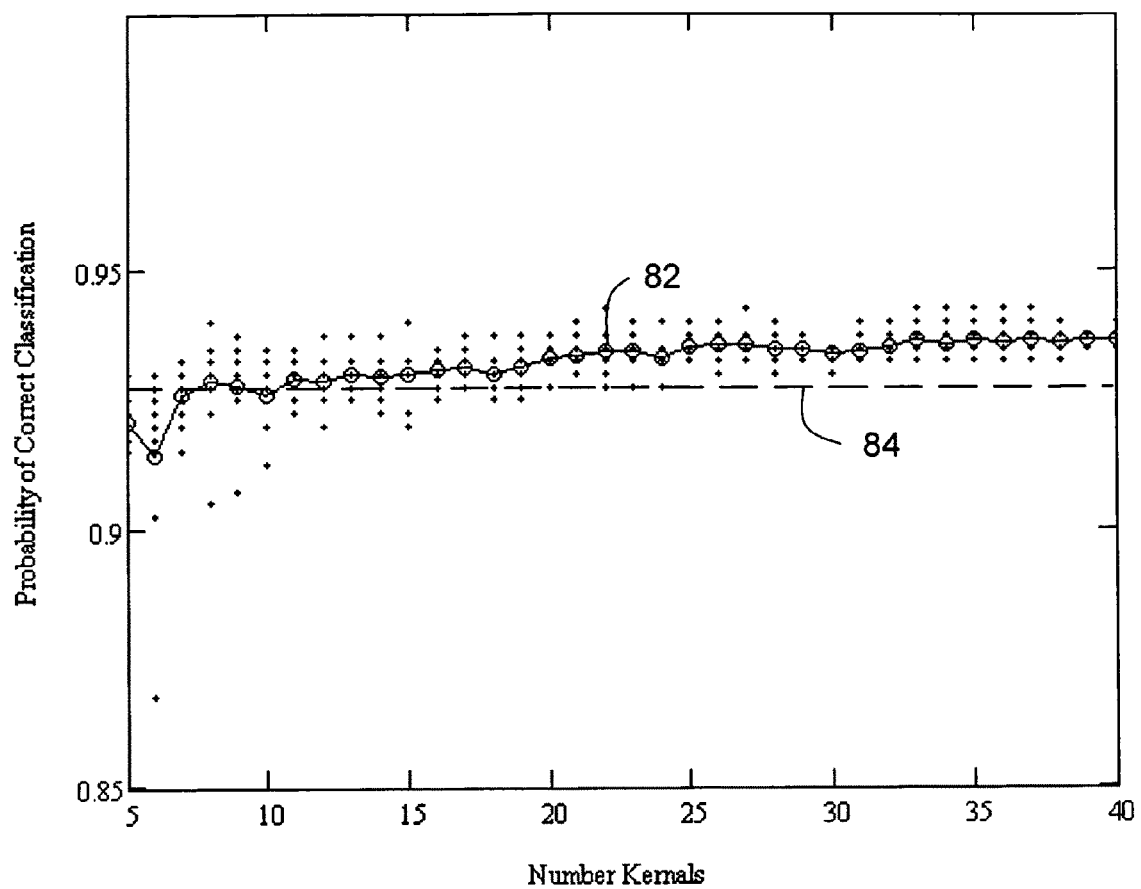
Figure 11C:
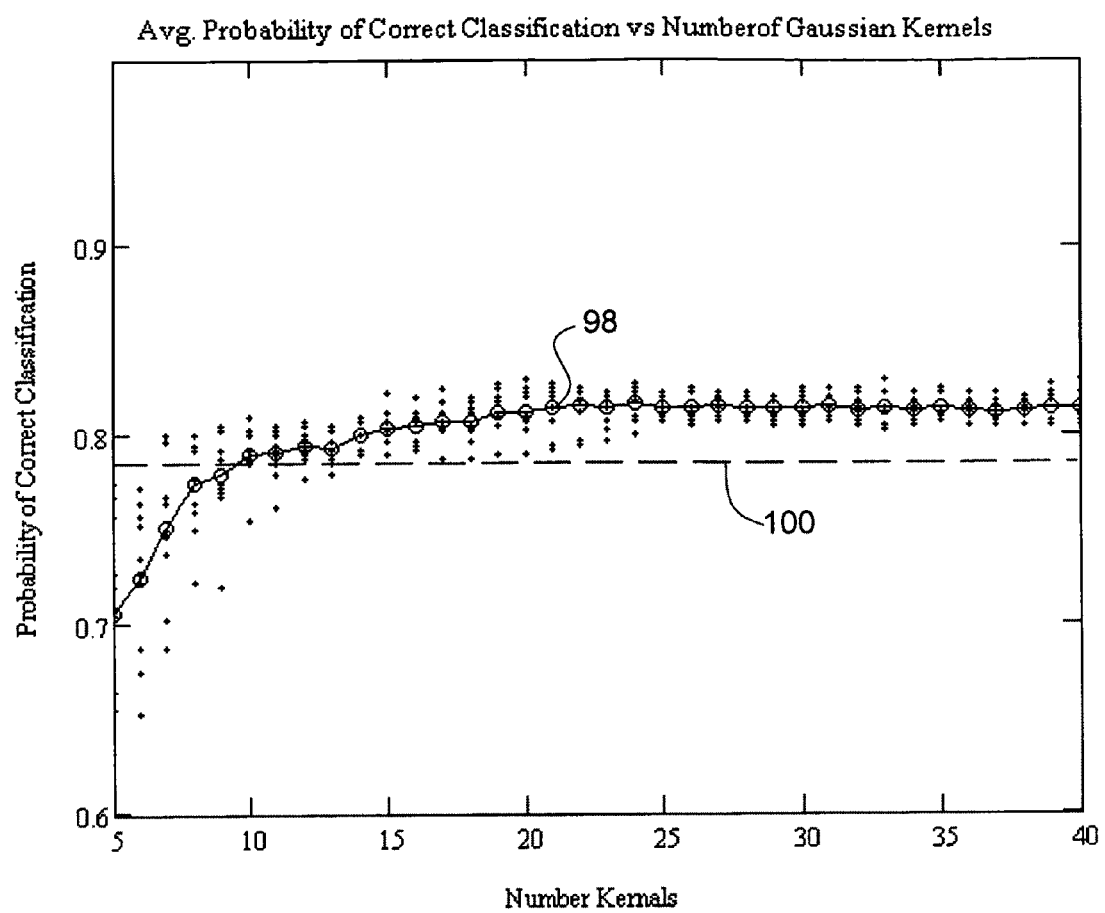
Figure 12C:
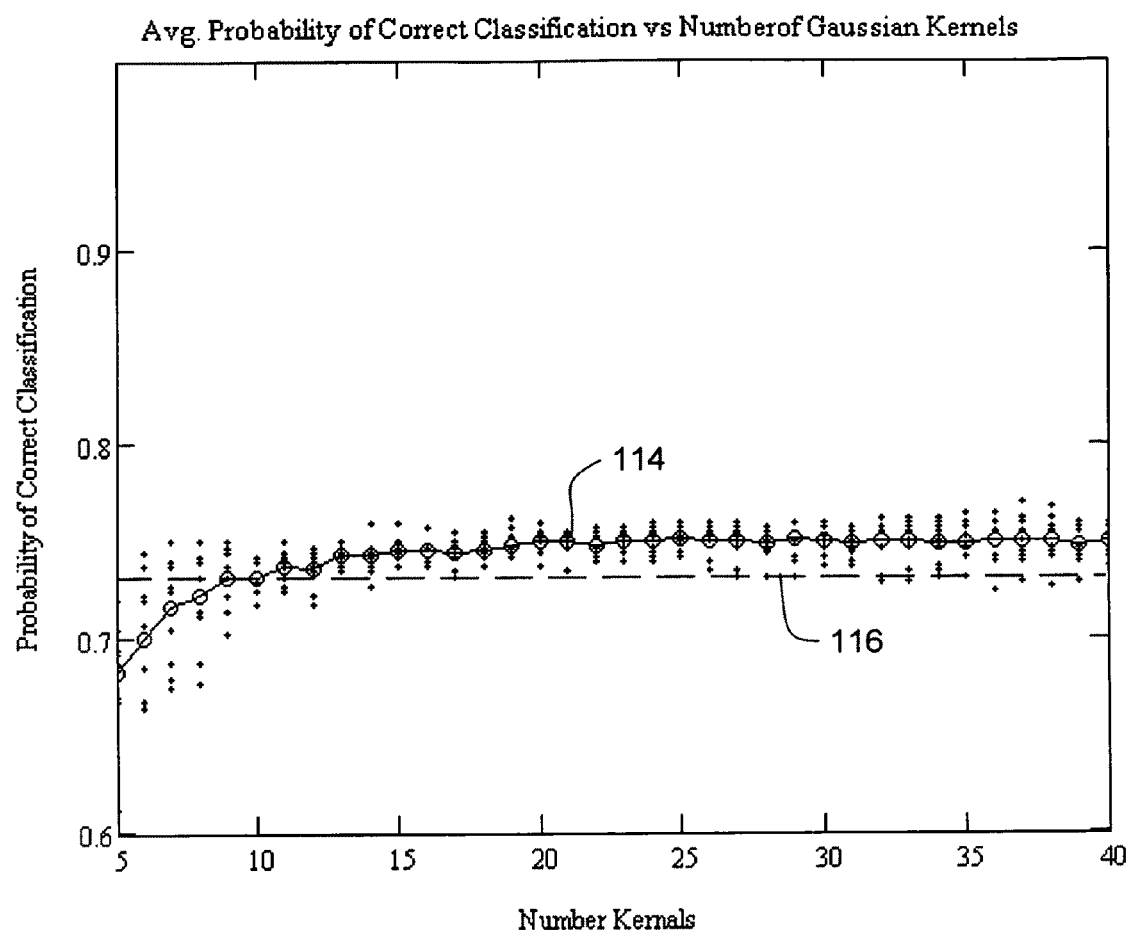

Referencing FIGS. 10C, 11C, and 12C, the performance of the adaptive Bayes classifier is evaluated as a function of the numbers of Parzen kernels used to estimate the class-of-interest posterior distribution function, $\hat{P}(C_{int}/X)$, plots 82, 98, and 114. For each number-of-kernels on the x-axis, adaptive Bayes classifier performance is evaluated ten times. The performance shown for the adaptive Bayes classifier, in plots 82, 98, and 114, is the average of the ten replications. Again referencing FIGS. 10C, 11C, and 12C, the performance of the Gaussian Maximum Likelihood classifier is shown in plots 84, 100, and 116. In these plots, 84, 100, and 116, it can be seen that the performance of the Gaussian Maximum Likelihood classifier is independent of the number-of-kernels. Again referencing FIGS. 10C, 11C, and 12C, it can be seen in plots 82, 98, and 114, that the performance of the adaptive Bayes classification is equal to or better than the Gaussian Maximum Likelihood classifier when ten or more kernels are used to estimate the class-of-interest posterior distribution function.

These three test cases demonstrate that the Adaptive Bayes Pattern Recognition system;
- Provides classification accuracies that are equal to or better than that provided by fully supervised classification approaches while using only labeled samples from the class-of-interest and without any a priori knowledge of the other-class in the input-data-set.
- In addition, these test results demonstrate that the Adaptive Bayes Pattern Recognition system is capable of providing accurate estimates of the decision boundary even when the class-of-interest and the class-other probability density functions are heavily overlapped.
- It was also shown that for two-dimensional data, only ten Parzen kernels are required to achieve the same or better classification accuracy as the Gaussian maximum likelihood classifier for two dimensional data sets. This reduces the number of computations required to classify large data sets and when performing real-time classification.

Detailed Description—Second Embodiment

Cluster analysis is a very important and useful technique for organizing large amounts of data. It is used in applications such as data mining, information retrieval, image segmentation, signal compression and coding, and machine learning [A. K. Jain, R. W. Duin, and J. Mao, "Statistical Pattern Recognition: A Review", *IEEE transactions on Pattern Analysis and Machine Intelligence*, vol. 22, no. 1, pp. 4-37, January 2000, pp. 27-31]. Typically, the goal in clustering is to find clusters which are representative the underlying population densities of the data set clustered. In addition, clustering algorithms often provide summary statistics on the clusters found in a data set (mean vectors, covariance matrices, and cluster a priori probabilities). When analyzing clustering results, often it is useful to label clusters and use these clusters in classify the data set from which they were generated.

Previously Minter [Minter, T. C. et al., Probabilistic cluster labeling of imagery data, NASA Report Accession Number: 83A11410; Doc. ID: 198300192, 1981] and Chittineni [Chittineni, C. B., Some approaches to optimal cluster labeling of aerospace imagery, NASA Report, Accession Number 81A30315; Doc. ID 19810045911, 1980] proposed maximum likelihood estimation techniques for cluster labeling. Although the maximum likelihood approach provided accurate cluster labels, it required that training sample be available for all classes. The technique cannot be used in applications where the only information available is labeled training samples for the classes-of-interest, and unlabeled patterns from the data set to be classified.

The second embodiment defines a least squares method for labeling clusters as belonging to one of two classes, either the class-of-interest or class-other, using only labeled training samples from the classes-of-interest, and unlabeled patterns from the data set to be classified.

A method is also defined for classifying the measurements vectors from the input-data-set into one of two classes, a class-of-interest or a class-other, utilizing cluster labels and cluster probability density functions.

Assuming the clusters have Gaussian distributions, we can use the clusters to define the probability density function, $\hat{P}(X)$, for the input-data-set, or $$\hat{P}(X) = \sum_{i=1}^{K} \hat{P}_{C_i} \hat{P}(X/C_i)$$

where

K=number of Gaussian probability density functions generated by the clustering algorithm
$\hat{P}_{C_i}$=estimated a priori probability of cluster $C_i$
$\hat{P}(X/C_i)$=probability density function of cluster $C_i$
where $$\hat{P}(X/C_i) = \frac{1}{2\pi^{d/2}|\Sigma|^{1/2}} e^{-1/2(X-\mu_i)^T \Sigma^{-1}(X-\mu_i)}$$

and
$\hat{\mu}_i$=estimate mean vector of cluster $C_i$
$\hat{\Sigma}_i$=estimated covariance matrix of cluster $C_i$
d=dimensionality of the data Let us define the cluster label as $P(C_{int}/C_i)$, which is the probability that cluster $C_i$ was generated by patterns from the class-of-interest in the input-data-set, where If $P(C_{int}/C_i)=1$, Then the label for the cluster $C_i$ is class-of-interest If $P(C_{int}/C_i)=0$, Then the label for the cluster $C_i$ is class-other If a cluster's density function was estimated using a mixture of samples from both the class-of-interest and class-other, we would expect $0<P(C_{int}/C_i)<1$.

If we have available a set of cluster labels, $[P(C_{int}/C_1), P(C_{int}/C_2), \ldots P(C_{int}/C_K)]$, we can readily estimated the class-of-interest posterior distribution function as follows $$P(C_{int}/X) = \sum_{i=1}^{K} \frac{P(C_{int}/C_i) \cdot P_{C_i} \cdot P(X/C_i)}{P(X)} \quad (73)$$

However, we typically do not know the true labels for each cluster. However, using labeled samples from the class-of-interest and unlabeled samples from the input-data-set, we can use the least square criterion, eq. (21) to estimate values for $P(C_{int}/C_i)$. The least square criterion was defined previously as $$J = E[\hat{P}(C_{int}/X)^2] + 2P_{C_{int}} E_{C_{int}}[\hat{P}(C_{int}/X)-1] + K' \quad (74)$$

For the second embodiment, we will approximate the class-of-interest posterior distribution function, $\hat{P}(C_{int}/X)$, using an expression of the form $$\hat{P}(C_{int}/X) \cong B^T F(X) \quad (75)$$

where we define the weight vector B as $$B = (P(C_{int}/C_1), P(C_{int}/C_2), \ldots P(C_{int}/C_K))^T \quad (76)$$

and where the function-of-measurements vector, F(X) is defined as $$F(X) = (f(X)_1, f(X)_2, \ldots f(X)_K)^T \quad (77)$$

We define f(X), in eq. (77), as $$f(X)_i = \frac{P_{C_i} P(X/C_i)}{P(X)} \quad (78)$$

and F(X) is defined as $$F(X) = \left[\frac{P_{C_1} P(X/C_1)}{P(X)}, \frac{P_{C_2} P(X/C_2)}{P(X)}, \ldots \frac{P_{C_K} P(X/C_K)}{P(X)}\right]^T \quad (79)$$

and we $B^T F(X)$ is $$B^T F(X) = P(C_{int}/C_1) \cdot \frac{P_{C_1} P(X/C_1)}{P(X)} + \quad (80)$$
$$P(C_{int}/C_2) \cdot \frac{P_{C_2} P(X/C_2)}{P(X)} \ldots + P(C_{int}/C_K) \cdot \frac{P_{C_K} P(X/C_K)}{P(X)}$$

or $$B^T F(X) = \sum_{i=1}^{K} P(C_{int}/C_i) \cdot \frac{P_{C_i} P(X/C_i)}{P(X)} \quad (81)$$

Substituting eq. (81) into eq. (74), we get $$J = E[(B^T F(X))^2] + 2P_{C_{int}} E_{C_{int}}[B^T F(X)-1] + K' \quad (82)$$

Differentiating eq. (82) with respect the weighting vector B and solving we get $$B = P_{C_{int}} E[(F(X)F(X)^T)]^{-1} \cdot E_{C_{int}}[F(X)] \quad (83)$$

Given a set of N unlabeled samples $(X_1, X_2, \ldots X_N)$ from the data set to be classified and M labeled samples from the class-of-interest, $(X_1(C_{int}), X_2(C_{int}), \ldots X_M(C_{int}))$, the weighting vector B may be estimated as follows:

$$B = P_{C_{int}} \left[ \frac{1}{N} \sum_{i=1}^{N} (F(X_i)F(X_i)^T) \right]^{-1} \cdot \frac{1}{M} \sum_{j=1}^{M} [F(X_j(C_{int}))] \quad (84)$$

where the prior probability of the class-of-interest, $P_{C_{int}}$, is assumed to be known.

Given estimates of $P(C_{int}/C_i)$, from eq. (48), or $B=(P(C_{int}/C_1), P(C_{int}/C_2), \ldots P(C_{int}/C_K))^T$, we can label clusters as follows If $P(C_{int}/C_i) \geq \frac{1}{2}$ (85)

Classify cluster $C_i$ as the class-of-interest
Otherwise, classify cluster $C_j$ as class-other In addition, we can estimate $\hat{P}(C_{int}/X)$, using the weighting vector, B, from eq. (84), and $B^T F(X)$, eq. (81). Substituting eq. (75) into eq. (10) we can use the adaptive Bayes decision rule to classify measurement vectors from the input-data-set as either class-of-interest or class-other as follows If: $B^T F(X) \geq \frac{1}{2}$, (86)

Classify X as the class-of-interest
Otherwise, classify X as class-other

Figure 13:
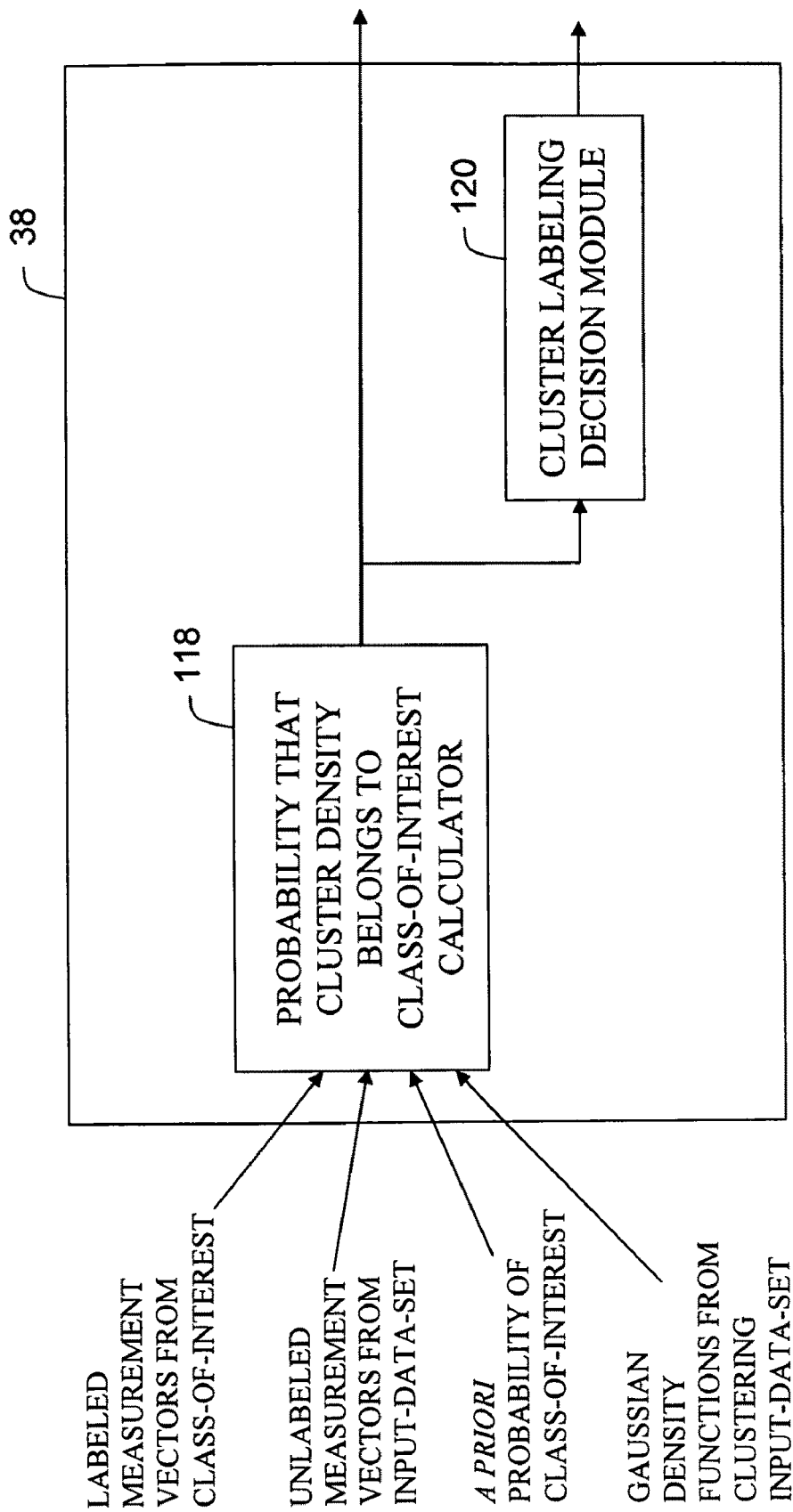
FIG. 13 is the processing flow diagram for the training module for the second embodiment of the Adaptive Bayes Pattern Recognition system.
Figure 14:
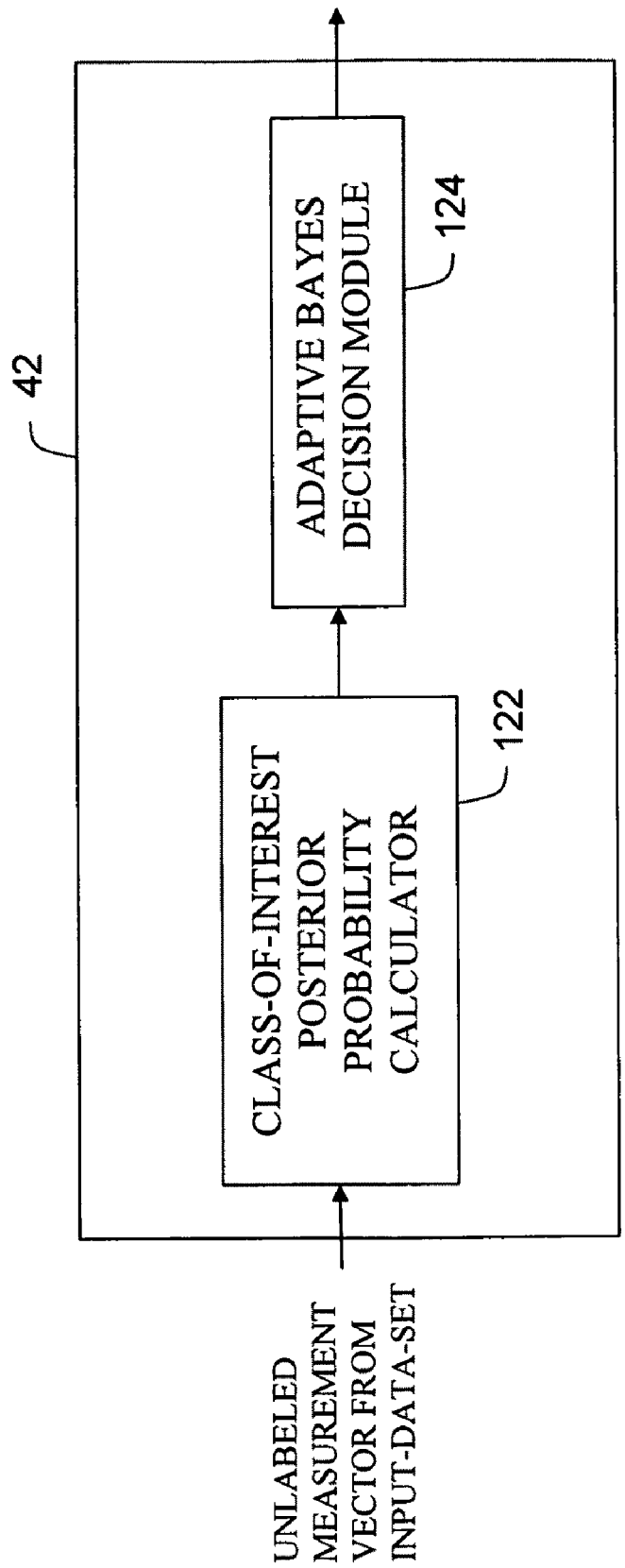
FIG. 14 is the processing flow for the adaptive Bayes classifier for the second embodiment of the Adaptive Bayes Pattern Recognition system.

Operation—Second Embodiment—FIGS. 13 and 14

Referencing FIG. 13, the off-line method for the second embodiment begins with step 118, with the receipt of K clusters, which are representative of the underlying population densities of the input-data-set.

Utilizing labeled measurement vectors from the class-of-interest, unlabeled measurement vectors from the input-data-set, and the a priori probability of the class-of-interest, step 118 calculates the cluster label probabilities $P(C_{int}/C_1)$, $i=1, \ldots K$. The probability $P(C_{int}/C_i)$ is the probability that cluster $C_i$ was generated by the measurement vectors from the class-of-interest. This is accomplished by estimating the weighting vector $B=(P(C_{int}/C_1), P(C_{int}/C_2), \ldots P(C_{int}/C_K))^T$, using the expression $$B = P_{C_{int}} \left[ \frac{1}{N} \sum_{i=1}^{N} (F(X_i)F(X_i)^T) \right]^{-1} \cdot \frac{1}{M} \sum_{j=1}^{M} [F(X_j(C_{int}))] \quad (87)$$

where the prior probability of the class-of-interest, $P_{C_{int}}$, is assumed to be known and F(X) is defined as $$F(X) = \left[ \frac{P_{C_1} P(X/C_1)}{P(X)}, \frac{P_{C_2} P(X/C_2)}{P(X)}, \ldots \frac{P_{C_K} P(X/C_K)}{P(X)} \right]^T \quad (88)$$

where $$\hat{P}(X) = \sum_{i=1}^{K} \hat{P}_{C_i} \hat{P}(X/C_i) \quad (89)$$

and
K=number of Gaussian clusters found by the clustering algorithm $\hat{P}_{C_i}$=estimated prior probability of the cluster $C_i$ (90)

$\hat{P}(X/C_i)$=probability density function of cluster $C_i$ (91)

where $$\hat{P}(X/C_i) = \frac{1}{2\pi^{d/2}|\Sigma|^{1/2}} e^{-1/2(X-\mu_i)^T \Sigma^{-1}(X-\mu_i)} \quad (92)$$

and
$\hat{\mu}_i$=estimate mean vector of the cluster $C_i$
$\hat{\Sigma}_i$=estimated covariance matrix of the cluster $C_i$
d=dimensionality of the data Again referencing FIG. 13, in step 120, the clusters are labeled as class-of-interest or class-other using the probabilities, $P(C_{int}/C_i)$, and the following decision rule If $P(C_{int}/C_i) \geq \frac{1}{2}$ (93)

Classify cluster $C_i$ as the class-of-interest
Otherwise, classify cluster $C_i$ as class-other Referencing FIG. 14, the on-line methods begins with step 122 where the class-of-interest posterior probability, $\hat{P}(C_{int}/X)$, is calculated for a measurement vector from the input-data-set, where $$\hat{P}(C_{int}/X) \cong B^T F(X) \quad (94)$$

and $$B^T F(X) = \sum_{i=1}^{K} P(C_{int}/C_i) \cdot \frac{P_{C_i} P(X/C_i)}{P(X)} \quad (95)$$

and $P_{C_i}$, $\hat{P}(X/C_i)$, and $\hat{P}(X)$ are defined in eqs. (90), (92), and (89) respectively.

Again referencing FIG. 14, in step 124, an input measurement vector from the input-data-set is classified into one of two classes, either as class-of-interest or as class-other using the adaptive Bayes decision rule, or If: $B^T F(X) \geq \frac{1}{2}$, (96)

Classify X as the class-of-interest
Otherwise, classify X as class-other
where $B^T F(X)$ was calculated previously using eq. (95).

Performance Evaluation of the Adaptive Bayes Pattern Recognition System in Cluster Labeling and Classification—FIG. 15

The performance of the Adaptive Bayes Pattern Recognition system in labeling clusters and classifying an input-data-set is evaluated using simulated data. Evaluated are the accuracy in cluster labeling and the accuracy in classifying data utilizing cluster labels and the cluster probability density functions. Cluster label probabilities were estimated using labeled training data from the class-of-interest, and unlabeled data from an input-data-set. The performance of the adaptive Bayes classification algorithm using clusters is compared to the performance of the standard Gaussian maximum likelihood classifier. The same data is used for both training and test. The a priori probability of the class-of-interest is assumed to be known.

The Gaussian maximum likelihood classification results provide a benchmark to compare the performance of the adaptive Bayes classification algorithm against. The Gaussian maximum likelihood classifier uses estimated class statistics (estimated means and covariance matrices). Classification accuracies are evaluated using labeled samples.

Figure 15A:
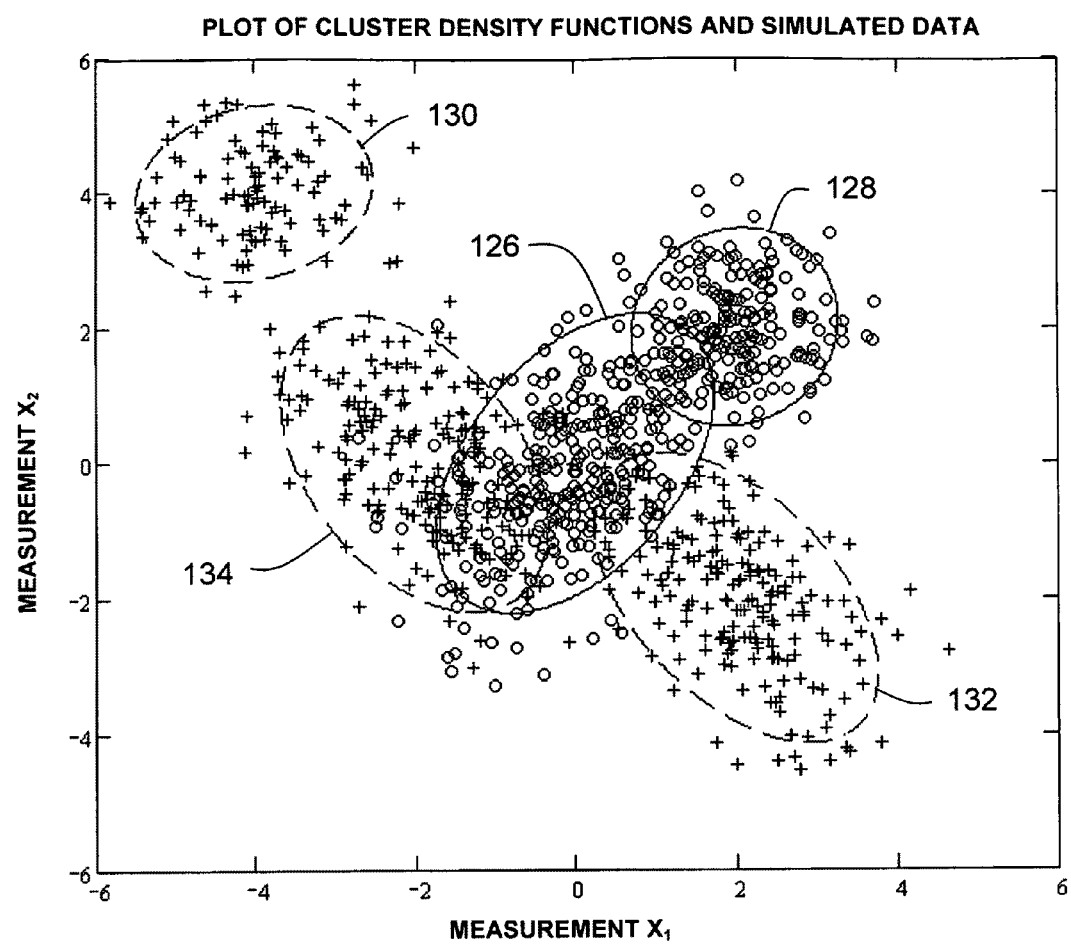

The results from this test are summarized in FIGS. 15A to 15D. FIG. 15D shows the generating statistics for five clusters used in the test. In this test, clusters $C_1$ and $C_2$ are assumed to have been generated from measurement vectors from the class-of-interest. Clusters $C_3$, $C_4$, and $C_5$ are assumed to have been generated from measurement vectors from the class-other. One-thousand unlabeled samples were generated from these five clusters in accordance with the proportions shown in FIG. 15D. FIG. 15A shows a plot of the samples generated from the five clusters with $C_1$=126, $C_2$=128, $C_3$=130, $C_4$=132, and $C_5$=134. Also show in FIG. 15A are two-standard deviation error ellipses for each cluster. In FIG. 15A it can be seen that the density functions of the two class-of-interest clusters, $C_1$ and $C_2$, are overlapped and also that class-of-interest cluster $C_1$ overlaps the density functions of class-other clusters $C_4$ and $C_5$.

Two hundred labeled samples were generated from the two class-of-interest clusters, $C_1$ and $C_2$, for use in least squares estimation of the cluster labels.

Figure 15B:
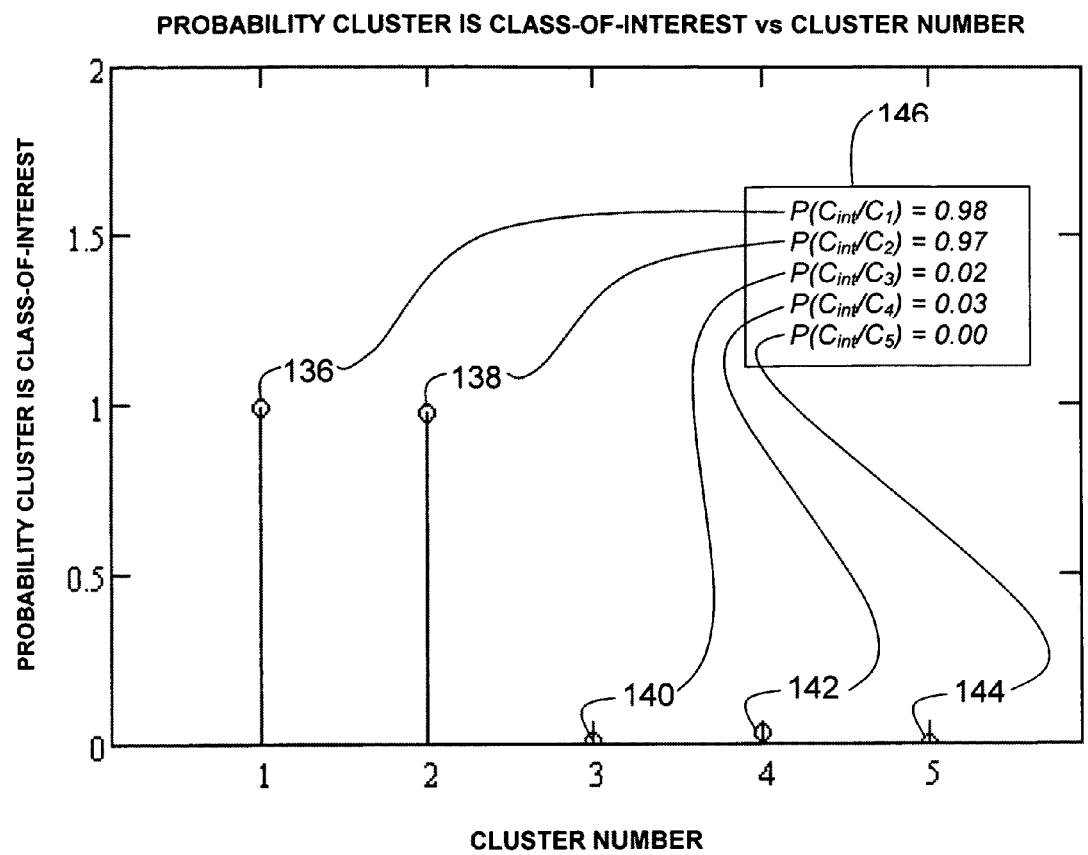

Referencing FIG. 15B, table 146 shows the results from estimating of cluster label probabilities. Again referencing FIG. 15B, it can be seen that the probabilities that clusters $C_1$ 136 and $C_2$ 138 are class-of-interest were estimated to be of 0.98 and 0.97, respectively. Again referencing FIG. 15B, it can be seen that the probabilities that clusters $C_3$ 140, $C_4$ 142, and $C_5$ 144 are class-of-interest, are very low with probabilities that varied between 0.00 and 0.03. Using the cluster labeling rule, eq. (93), clusters $C_1$ and $C_2$ would be labeled correctly a belonging to the class-of-interest and clusters $C_3$, $C_4$, and $C_5$ would be labeled correctly as belonging to class-other.

Referencing the table in FIG. 15C, it can be seen that using the cluster labels and the cluster probability density functions, the unlabeled samples from the input-data-set were classified with 91.4% accuracy using the adaptive Bayes classifier, eq. (96). Again referencing FIG. 15C, it can be seen that the adaptive Bayes classifier results are identical to the classification results obtained using the fully supervised Gaussian maximum likelihood classifier.

In summary, these test results demonstrate that the Adaptive Bayes Pattern Recognition system is capable of accurately labeling clusters. The results also show that the cluster label probabilities and cluster probability density functions can be utilized to accurately classify an input-data-set using the adaptive Bayes decision rule. The results also demonstrate that cluster labeling accuracy is not affected by overlap between the cluster density functions.

CONCLUSION, RAMIFICATIONS, AND SCOPE

Accordingly the reader will see that the Adaptive Bayes Pattern Recognition system can be used in many real world applications where class definitions, through training samples or otherwise, are provided a priori only for the classes-of-interest. The distribution of the other-class may be 1) unknown, 2) may have changed 3) may be inaccurate due to insufficient numbers of samples used to estimate the distribution of the other-class, or 4) the cost of obtaining labeling samples, for purposes of defining all the classes in a given data set, by collecting ground truth or otherwise, may be very expensive or impossible to obtain. Often one is only interested in one class or a small number of classes.

Examples where the capabilities of the Adaptive Bayes Pattern Recognition system would be potentially very beneficial can be found in Home Land Security, remote sensing, target recognition and underground nuclear weapons explosion detection.

Of particular interest since 9/11 are biometrics [A. K. Jain, "Biometrics: A Grand Challenge", Proceeding of the 17$^{th}$ International Conference on Pattern Recognition, (ICPR'04)] which involves identification of people based on distinctive personal traits (such as facial characteristics, fingerprints, iris patterns, speech patterns) and screening/monitoring of people in public places for persons of interest. In the USA Patriot Act and the Enhanced Border Security and Visa Entry Reform Act of 2002, the U.S. Congress mandated the use of biometrics in U.S. visas [NIST report to the United States Congress, "Summary of NIST Standards for Biometric Accuracy, Tamper Resistance, and Interoperability." Available at ftp://sequoyah.nist.gov/pub/nist_internal_reports/NISTAPP_Nov02.pdf, November 2002]. This law requires that Embassies and Consulates abroad must now issue to international visitors, "only machine-readable, tamper-resistant visas and other travel and entry documents that use biometric identifiers". Congress also mandated the development of technology that uses-these biometric identifiers to positively identify person entering the United States.

In addition, Home Land Security has a need for security screening and surveillance in public spaces to determine the presents of people on a watch-list using facial biometrics [A. K. Jain, "Biometrics: A Grand Challenge", Proceeding of the 17$^{th}$ International Conference on Pattern Recognition, (ICPR'04)]. The screening watch-list typically consists of pictures of a few hundred persons. Normally, no a priori knowledge is available of the identities on the other persons observed in the public space that might be mis-identified with people on the watch-list.

In remote sensing applications, ground truth maps, providing prior information on all land cover typologies in an image, do not really describe all the types of land cover types in the image [P. Mantero, "Partially supervised classification of remote sensing images using SVM-based probability density estimation", IEEE Transactions on Geoscience and Remote Sensing, vol. 43, no. 3, March 2005, pp. 559-570]. In addition, one is often interested in identifying picture elements (pixels) belonging to only one or a small number of classes. Generation of a complete training set for all the land cover types in an image is time-consuming, difficult, and expensive.

Target recognition applications [B. Eckstein, "Evaluating the Benefits of assisted Target Recognition", Proceeding of the 30$^{th}$ Applied Imagery Pattern recognition Workshop (AIPR"01)] [S. Rizvi, "Fusion Techniques for Automatic Target Recognition", Proceedings of the 32$^{nd}$ Applied Imagery Pattern Recognition Workshop (AIPR'03)] often involve recognition of high valued mobile military targets such as tanks in imagery data collected in real time. Often no prior knowledge is available of the other objects in the image which might be confused with a tank, such as decoys (anything that mimics a target but is not a real target), background clutter, man-made structures, and civilian vehicles.

U.S. Pat. No. 5,373,486, issued to Dowla et al., discloses a method for seismic event classification, with particular emphasis on detecting and identifying underground nuclear explosions for purposes of verifying nuclear test band treaties. There are many seismic sources including earthquakes, underground nuclear explosions, mining shots, cultural activities such as moving trucks or trains, and natural noise sources such as wind, ocean waves, or the breaking of glaciers. Underground nuclear explosions have a known seismic signature. However, the signatures of other seismic events cannot be completely known a prior, since each of these other events tend to have unique and unpredictable signatures. Dowla et al., discloses a method of clustering input seismic events and then labeling each cluster based on matches to a large historic database of previously known seismic events.

Lack of reliable a priori knowledge of the signatures of future seismic events that may occur, limits the accuracy of this approach to seismic event classification.

In each of these applications there is a set of labeled training data from the class-of-interest (pictures of persons on a watch-list, land cover types, high valued military targets, or seismic signatures of nuclear explosions). The input-data-set consists of unlabeled measurement vectors from the class-of-interest and from the unknown other-class. The first embodiment of the Adaptive Bayes Pattern Recognition system is capable of classifying these streams of unlabeled measurement vectors into two classes, either as class-of-interest or as class-other, with minimum error. The second embodiment of the Adaptive Bayes Pattern Recognition system is capable of processing the results from clustering an input-data-set to both label the clusters and classify input-data-sets into two classes, a class-of-interest and a class-other, with minimum error.

Additional advantages of the Adaptive Bayes Pattern Recognition system are:
  The method provides minimum classification error. It is well known that in supervised classification problems, the probability of error due to a Bayes classifier is the best that can be achieved.
  The method is adaptive in the sense that it adapts the decision boundary to provide optimal discrimination between class-of-interest and any unknown class-other which may exist in the data set to be classified.
  The method is a nonparametric classification procedure which means it can readily approximate highly complex decision boundaries. No a priori knowledge is required of the distributions of the class-of-interest and the other-class.
  The method can process high dimension measurement vectors with only a small increase in the number of computations and with reduced risk of introducing numerical errors in training and classification process.
  The method is computationally efficient. It was shown that a two dimension data set can be accurately classified using only ten Gaussian density functions to approximate the class-of-interest posterior distribution function.

While my above description contains many specificities, these should not be construed as limitations on the scope of the invention, but rather as an exemplification of the presently preferred embodiments. The scope of the embodiment should be determined by appended claims and their legal equivalents, rather than by the examples given.

I claim:

1. A computer-implemented method of classifying a pattern into one of two classes, a class-of-interest and a class-other, comprising the steps of:
  receiving a training set of class-of-interest patterns, a set of unlabeled patterns from an input-data-set, and an estimate of the a priori probability of said class-of-interest in said input-data-set, said input-data-set being at least one of any image, video or speech data set;
  selecting a predetermined number of Gaussian kernel densities functions;
  selecting parameter values for said Gaussian kernel densities functions where said selected parameter values cause said Gaussian kernel densities to approximate the probability density function of said input-data-set;
  executing a training stage using said a priori probability of said class-of-interest, said training set of class-of-interest patterns, and said unlabeled patterns from said input-data-set, said training stage including a step of least squares approximation of a class-of-interest posterior distribution function using a linear combination of weighted said Gaussian kernel density functions;
  classifying said pattern from said input-data-set as being either said class-of-interest or said class-other in accordance with a conditional test defined by a adaptive Bayes decision rule; and
  wherein said pattern from said input-data-set is classified with minimum error as said class-of-interest or said class-other using said adaptive Bayes decision rule, where said adaptive Bayes decision rule is defined using said a priori probability of said class-of-interest, said training set of class-of-interest patterns, and said unlabeled patterns from said input-data-set, and without any a priori knowledge of said class-other.

2. The method of claim 1 wherein said step of a means for selecting said parameter values for said Gaussian kernel densities functions includes a step of randomly selecting said predetermined number of said patterns from said input-data-set and setting the mean vector of each said Gaussian kernel density function equal to one of said selected patterns.

3. The method of claim 1 wherein said step of a means for selecting said parameter values for said Gaussian kernel densities functions includes a step of specifying a kernel smoothing parameter value for each said Gaussian kernel density function, with said kernel smoothing parameter value estimated using the expression $$\hat{H} = \sum_{j=1}^{N} \sum_{i=1}^{M} \frac{P_{k_i} \cdot P(X_j/k_i)}{P(X_j)} \cdot \left[\frac{1}{2}(X_j - X_i)(X_j - X_i)^T\right] \quad (97)$$

where $\hat{H}$ is the estimated value for said kernel smoothing parameter value.

4. The method of claim 1 wherein said step of executing said training stage includes a step of providing a plurality of said weights for each said Gaussian kernel density function.

5. The method of claim 4 wherein said step of providing a plurality of said weights for each said Gaussian kernel density function includes a step of providing a first weight for each said Gaussian kernel density function whose value is equal to the inverse of the probability of a said pattern in said input-data-set.

6. The method of claim 4 wherein said step of providing a plurality of said weights for each said Gaussian kernel density function includes a step of providing a second weight for each said Gaussian kernel density function whose value is selected to ensure that said linear combination of weighted Gaussian kernel density functions approximates said class-of-interest posterior distribution function in a least squares sense using the expression $$A = P_{C_{int}} \left[\frac{1}{N} \sum_{i=1}^{N} (F(X_i)F(X_i)^T)\right]^{-1} \cdot \frac{1}{M} \sum_{j=1}^{M} [F(X_j(C_{int}))] \quad (98)$$

where $A = (a_1, a_2, \ldots a_R)^T$ is a vector of estimated values for said second weight.

7. The method of claim 1 wherein said step of classifying said pattern from said input-data-set as being said class-of-interest or said class-other includes a step of estimating a value for said class-of-interest posterior probability, $\hat{P}(C_{int}/X)$, for said pattern using the expression $$\hat{P}(C_{int}/X) \cong A^T F(X) \quad (99)$$

where $$A^T F(X) = a_1 \frac{P(X/k_1)}{P(X)} + a_2 \frac{P(X/k_2)}{P(X)} \ldots + a_R \frac{P(X/k_R)}{P(X)} \quad (100)$$

and $A^T F(X)$ is the said estimated value of said class-of-interest posterior probability, $\hat{P}(C_{int}/X)$.

8. The method of claim 1 wherein said step of classifying said pattern from said input-data-set includes a step of assigning said pattern to either said class-of-interest or said class-other based on said value of said class-of-interest posterior probability, $\hat{P}(C_{int}/X)$ and a conditional test defined by said adaptive Bayes decision rule, as defined in the following expression If: $A^T F(X) \geq \frac{1}{2}$, (101)

Classify X as the class-of-interest
Otherwise, classify X as class-other where $A^T F(X)$ is the said estimated value of said class-of-interest posterior probability, $\hat{P}(C_{int}/X)$.

9. A computer-implemented method for labeling Gaussian probability density functions representative of the underlying population densities in an input-data-set, as belonging to one of two classes, either a class-of-interest or a class-other; and a method for classifying a pattern from said input-data-set into one of two classes, either a said class-of-interest or a said class-other, comprising the steps of:
  receiving a training set of class-of-interest patterns, a set of unlabeled patterns from said input-data-set, and an estimate of the a priori probability of said class-of-interest in said input-data-set, said input-data-set being at least one of an image, video or speech data set;
  receiving a plurality of said Gaussian probability density functions, representative of said underlying population densities in said input-data-set;
  executing a training stage utilizing said estimate of the a priori probability of said class-of-interest, said training set of class-of-interest patterns, and said patterns from said input-data-set, said training stage including a step of least squares estimation of the probabilities that said Gaussian probability density functions belong to said class-of-interest, utilizing using a linear combination of weighted said Gaussian density functions;
  labeling each said Gaussian probability density function as belonging to said class-of-interest or to said class-other, based on a predetermined conditional test of the value of said probability that said Gaussian probability density function belong to said class-of-interest;
  classifying said pattern from said input-data-set as being said class-of-interest or said class-other using an adaptive Bayes decision rule; and
  wherein said Gaussian probability density functions, representative of the underlying said population densities in said input-data-set, are labeled with minimum error as belonging to said class-of-interest or class-other using a said predetermined decision rule and said pattern from said input-data-set is classified with minimum error using said adaptive Bayes decision rule, with both classifiers trained without any a priori knowledge of said class-other.

10. The method of claim 9 wherein said step of receiving a plurality of said Gaussian probability density functions, includes a step of receiving an estimate of the a priori probability of each said Gaussian probability density function in said input-data-set, and a step of receiving a mean vector, and a covariance matrix for each said Gaussian probability density function.

11. The method of claim 9 wherein said step of executing the training stage includes a step of providing a plurality of said weights for each said Gaussian probability density function.

12. The method of claim 11 wherein said step of providing a plurality of said weights for each said Gaussian probability density function includes a step of providing a first weight for each said Gaussian probability density function whose value is equal to said a priori probability of said Gaussian density function in said input-data-set.

13. The method of claim 11 wherein said step of providing a plurality weights for each said Gaussian probability density function includes a step of providing a second weight for each said Gaussian probability density function whose value is equal to the inverse of the probability of said pattern in said input-data-set.

14. The method of claim 11 wherein said step of providing a plurality weights for each said Gaussian probability density function includes a step of providing a third weight for each said Gaussian probability density function whose value is the probability that said Gaussian probability density function belongs to said class-of-interest, estimated using the expression $$B = P_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))] \quad (102)$$

where the vector $B = (P(C_{int}/C_1), P(C_{int}/C_2), \ldots P(C_{int}/C_K))^T$ is a vector of estimated said values of said third weight and $P(C_{int}/C_i)$ is said probability that said Gaussian probability density function $C_i$ belongs to said class-of-interest.

15. The method of claim 9 wherein said step of labeling each said Gaussian probability density function includes a step of applying said conditional test defined by said predetermined decision rule to label each said Gaussian probability density function as either said class-of-interest or as said class-other, as defined in the following expression If $P(C_{int}/C_i) \geq \frac{1}{2}$ (103)

Label Gaussian denstiy $C_i$ as the class-of-interest
Otherwise, label Gaussian density $C_i$ as class-other 16. The method of claim 9 wherein said step of classifying said pattern from said input-data-set as either said class-of-interest or as said class-other includes a step of estimating a value for said class-of-interest posterior probability for said pattern using the expression $$\hat{P}(C_{int}/X) \approx B^T F(X) \quad (104)$$

where $\hat{P}(C_{int}/X)$ is said estimated value of said class-of-interest posterior probability for said pattern and $$B^T F(X) = \sum_{i=1}^{K} P(C_{int}/C_i) \cdot \frac{P_{C_i} P(X/C_i)}{P(X)} \quad (105)$$

and $B^T F(X)$ is said linear combination of said weighted Gaussian probability density functions.

17. The method of claim 9 wherein said step of classifying said pattern from said input-data-set includes a step of classifying said pattern as either said class-of-interest or as said class-other based on said value of said class-of-interest posterior probability and said adaptive Bayes decision rule, as defined in the following expression If: $B^T F(X) \geq \frac{1}{2}$, (106)

Classify X as the class-of-interest

Otherwise classify X as class-other where $B^T F(X)$ is said estimated value of said class-of-interest posterior probability, $\hat{P}(C_{int}/X)$.

* * * * *